US012793418B2

(12) United States Patent
Karganroodi et al.

(10) Patent No.: US 12,793,418 B2
(45) Date of Patent: Nov. 10, 2026

(54) MEDIA CLASSIFICATION SYSTEM

(71) Applicant: Tubi, Inc., San Francisco, CA (US)

(72) Inventors: Aidean Sharghi Karganroodi, Pearland, TX (US); Jaya Kawale, San Jose, CA (US)

(73) Assignee: Tubi, Inc., San Francisco, CA (US)

( * ) Notice: Subject to any disclaimer, the term of this patent is extended or adjusted under 35 U.S.C. 154(b) by 265 days.

(21) Appl. No.: 18/786,387

(22) Filed: Jul. 26, 2024

(65) Prior Publication Data

US 2026/0030886 A1 Jan. 29, 2026

(51) Int. Cl.

| | |
|---|---|
| ***G06V 20/40*** | (2022.01) |
| ***G06V 30/18*** | (2022.01) |
| ***G06V 30/19*** | (2022.01) |
| ***G10L 15/02*** | (2006.01) |
| ***G10L 15/06*** | (2013.01) |
| ***G10L 15/183*** | (2013.01) |
| ***G10L 25/57*** | (2013.01) |

(Continued)

(52) U.S. Cl.

CPC .............. *G06V 20/41* (2022.01); *G06V 20/46* (2022.01); *G06V 30/18* (2022.01); *G06V 30/19147* (2022.01); *G10L 15/02* (2013.01); *G10L 15/063* (2013.01); *G10L 15/183* (2013.01); *G10L 25/57* (2013.01); *H04N 21/23418* (2013.01); *H04N 21/251* (2013.01); *H04N 21/2668* (2013.01)

(58) Field of Classification Search

CPC ........ G06V 20/41; G06V 20/46; G06V 30/18; G10L 15/02; G10L 15/183; G10L 5/57; H04N 21/23418; H04N 21/251; H04N 21/2668

See application file for complete search history.

(56) References Cited

U.S. PATENT DOCUMENTS 6,546,554 B1 4/2003 Schmidt
6,804,816 B1 10/2004 Liu (Continued)

OTHER PUBLICATIONS

An overview of computational challenges in online advertising. IEEE. 2013. (Year: 2013).

(Continued)

*Primary Examiner* — Raphael Schwartz
(74) *Attorney, Agent, or Firm* — Redbrick IP, P.C.

(57) ABSTRACT

A system and method for classifying media content, including: a computer processor and a video extraction and inference engine service executing on the computer processor and including functionality to obtain a video component and an audio component of a media item, perform optical character recognition (OCR) on a subset of frames of the video component, generate processed OCR text, and perform feature extraction on the processed OCR text to generate feature vectors representing the video component; an audio extraction and inference engine including functionality to transcribe the audio component to generate transcribed audio text, and perform feature extraction on the transcribed audio text to generate feature vectors representing the audio component; and a classification model serving engine configured to execute a classification-based machine learning model based on the feature vectors to generate a binary inference indicating the likelihood of the media item being associated with a predefined classification.

15 Claims, 10 Drawing Sheets

(51) Int. Cl.

| | |
|---|---|
| ***H04N 21/234*** | (2011.01) |
| ***H04N 21/25*** | (2011.01) |
| ***H04N 21/2668*** | (2011.01) |

(56) References Cited

U.S. PATENT DOCUMENTS

| | | | |
|---|---|---|---|
| 8,776,111 | B1 | 7/2014 | Eldering et al. |
| 9,215,123 | B1 | 12/2015 | Fears et al. |
| 9,277,275 | B1 | 3/2016 | Arini |
| 9,465,604 | B1 | 10/2016 | Burgyan et al. |
| 9,563,928 | B1 | 2/2017 | Sokolowski et al. |
| 10,007,863 | B1 | 6/2018 | Pereira et al. |
| 10,671,852 | B1 | 6/2020 | Zadeh et al. |
| 10,846,737 | B1 | 11/2020 | Matarese et al. |
| 10,887,421 | B2 | 1/2021 | Moassoudi |
| 11,463,540 | B2 | 10/2022 | Massoudi |
| 2001/0020255 | A1 | 9/2001 | Hofmann et al. |
| 2002/0111995 | A1 | 8/2002 | Mansour |
| 2002/0129129 | A1 | 9/2002 | Bloch |
| 2002/0129368 | A1 | 9/2002 | Schlack et al. |
| 2002/0146181 | A1 | 10/2002 | Azam |
| 2002/0178126 | A1 | 11/2002 | Beck et al. |
| 2003/0191726 | A1 | 10/2003 | Kirshenbaum |
| 2003/0235184 | A1 | 12/2003 | Dorenbosch et al. |
| 2005/0049998 | A1 | 3/2005 | Ruhlow |
| 2005/0101321 | A1 | 5/2005 | Ikeda et al. |
| 2005/0172243 | A1 | 8/2005 | Pabla |
| 2005/0177835 | A1 | 8/2005 | Chickering |
| 2006/0075019 | A1 | 4/2006 | Donovan et al. |
| 2006/0253323 | A1 | 11/2006 | Phan et al. |
| 2007/0233671 | A1 | 10/2007 | Oztekin et al. |
| 2008/0082604 | A1 | 4/2008 | Mansour et al. |
| 2008/0259906 | A1 | 10/2008 | Shkedi |
| 2009/0006214 | A1 | 1/2009 | Lerman |
| 2009/0013051 | A1 | 1/2009 | Renschler et al. |
| 2009/0029687 | A1 | 1/2009 | Ramer et al. |
| 2009/0064301 | A1 | 3/2009 | Sachdeva |
| 2009/0089161 | A1 | 4/2009 | Alo et al. |
| 2009/0106785 | A1 | 4/2009 | Pharn |
| 2009/0129479 | A1 | 5/2009 | Yellamraju |
| 2009/0204478 | A1 | 8/2009 | Kaib et al. |
| 2010/0037255 | A1 | 2/2010 | Sheehan |
| 2010/0151816 | A1 | 6/2010 | Besehanic et al. |
| 2010/0211967 | A1 | 8/2010 | Ramaswamy et al. |
| 2010/0246981 | A1 | 9/2010 | Hu et al. |
| 2010/0332313 | A1* | 12/2010 | Miller ................ G06Q 30/0251 705/14.55 |
| 2011/0040636 | A1 | 2/2011 | Simmons et al. |
| 2011/0093335 | A1 | 4/2011 | Fordyce et al. |
| 2011/0103374 | A1 | 5/2011 | LaJoie et al. |
| 2011/0113116 | A1 | 5/2011 | Burdette et al. |
| 2011/0125594 | A1 | 5/2011 | Brown et al. |
| 2011/0167440 | A1 | 7/2011 | Greenfield |
| 2011/0219229 | A1 | 9/2011 | Cholas et al. |
| 2011/0225046 | A1 | 9/2011 | Eldering et al. |
| 2011/0246298 | A1 | 10/2011 | Williams et al. |
| 2011/0252305 | A1 | 10/2011 | Tschäni et al. |
| 2011/0258049 | A1 | 10/2011 | Ramer et al. |
| 2012/0007866 | A1 | 1/2012 | Tahan |
| 2012/0016655 | A1 | 1/2012 | Travieso |
| 2012/0029983 | A1 | 2/2012 | Rodriguez et al. |
| 2012/0089455 | A1 | 4/2012 | Belani et al. |
| 2012/0102169 | A1 | 4/2012 | Yu et al. |
| 2012/0151079 | A1 | 6/2012 | Besehanic et al. |
| 2012/0263385 | A1 | 10/2012 | van Zwol |
| 2013/0110634 | A1 | 5/2013 | Cochran et al. |
| 2013/0132856 | A1 | 5/2013 | Binyamin et al. |
| 2013/0156269 | A1 | 6/2013 | Matsui et al. |
| 2013/0198376 | A1 | 8/2013 | Landa et al. |
| 2013/0227068 | A1 | 8/2013 | Yasrebi et al. |
| 2013/0268951 | A1 | 10/2013 | Wyatt et al. |
| 2013/0311649 | A1 | 11/2013 | DeFrancesco et al. |
| 2013/0346202 | A1 | 12/2013 | Kouladjie |
| 2014/0059636 | A1 | 2/2014 | Patel |
| 2014/0075014 | A1 | 3/2014 | Chourey |
| 2014/0101739 | A1 | 4/2014 | Li et al. |
| 2014/0143052 | A1 | 5/2014 | Stryker |
| 2014/0157289 | A1 | 6/2014 | Aarts et al. |
| 2014/0181243 | A1 | 6/2014 | Nieuwenhuys |
| 2014/0282642 | A1 | 9/2014 | Needham et al. |
| 2014/0372415 | A1 | 12/2014 | Fernandez-Ruiz |
| 2014/0379911 | A1 | 12/2014 | Fayssal et al. |
| 2015/0055931 | A1 | 2/2015 | Koivukangas et al. |
| 2015/0082345 | A1 | 3/2015 | Archer et al. |
| 2015/0206198 | A1 | 7/2015 | Marshall |
| 2015/0234564 | A1 | 8/2015 | Snibbe et al. |
| 2015/0271540 | A1 | 9/2015 | Melby et al. |
| 2015/0382075 | A1 | 12/2015 | Neumeier et al. |
| 2016/0358099 | A1 | 12/2016 | Sturlaugson |
| 2016/0358209 | A1 | 12/2016 | Khozani et al. |
| 2016/0360289 | A1 | 12/2016 | Santoro et al. |
| 2017/0064411 | A1 | 3/2017 | Goli et al. |
| 2017/0193560 | A1 | 7/2017 | Bhalgat |
| 2017/0278289 | A1 | 9/2017 | Marino |
| 2018/0349391 | A1 | 12/2018 | Chechik |
| 2019/0138810 | A1 | 5/2019 | Chen et al. |
| 2019/0295122 | A1 | 9/2019 | Kumar |
| 2019/0332865 | A1 | 10/2019 | Dassa |
| 2020/0160389 | A1 | 5/2020 | Yang |
| 2020/0242364 | A1 | 7/2020 | Zadeh |
| 2021/0089780 | A1 | 3/2021 | Chang |
| 2021/0195286 | A1 | 6/2021 | Lohumi |
| 2022/0172384 | A1 | 6/2022 | Pereira |
| 2023/0342165 | A1* | 10/2023 | Huang ............... G06Q 30/0261 |
| 2024/0211999 | A1* | 6/2024 | Xu ..................... G06Q 30/0254 |

OTHER PUBLICATIONS

"A Semantic Framework for Delivery of Context-Aware Ubiquitous Services in Pervasive Environments". IEEE. 2012. (Year: 2012).

"Mediacampaign—A multi modal semantic analysis system for advertisement campaign detection". IEEE. 2008. (Year: 2008).

* cited by examiner

MEDIA CLASSIFICATION SYSTEM

BACKGROUND

Media content classification systems have evolved significantly over the past few decades, driven by advancements in machine learning, natural language processing, and computer vision. Initially, media content classification was a manual process, relying heavily on human effort to categorize and tag content. This method was not only time-consuming but also prone to inconsistencies and errors due to subjective interpretations.

The advent of machine learning in the late 20th and early 21st centuries brought about a transformative change in this field. Early machine learning algorithms enabled automated classification of media content, although these initial models often required extensive manual feature engineering and were limited in their ability to generalize across different types of content. These models typically relied on basic statistical methods and were primarily used for simpler classification tasks.

As computational power increased and more sophisticated algorithms were developed, the field saw a significant shift with the introduction of deep learning. Deep learning models, particularly convolutional neural networks (CNNs) and recurrent neural networks (RNNs), became the standard for image and text analysis, respectively. These models reduced the need for manual feature engineering by automatically learning relevant features from the data.

The rapid advancement in cloud computing and the availability of vast datasets have also played a crucial role in the progress of media content classification technologies. Cloud-based platforms offer scalable resources for training and deploying complex models, making advanced classification tools accessible to a broader range of applications and industries. Large datasets, often curated and labeled through crowdsourcing, provide the necessary data to train sophisticated models and validate their performance across diverse scenarios.

Today, media content classification systems are integral to various industries, including advertising, entertainment, education, and healthcare. These systems help manage and curate vast amounts of digital content, enhance personalized user experiences, and ensure compliance with regulatory standards by identifying and filtering out inappropriate or sensitive content. As technology continues to advance, the capabilities of media content classification systems are expected to expand further, addressing new challenges and unlocking innovative applications across different domains.

SUMMARY

In general, in one aspect, embodiments relate to systems and methods for classifying media content. This can include separate analysis of audio and video components of a media item in order to generate one or more sets of feature vectors representing attributes of the media item for purposes of classification. These feature vectors are then utilized as inputs to a classification-based machine learning model to generate an inference indicating the likelihood of the media item being associated with a predefined classification.

In general, in one aspect, embodiments relate to a system for classifying media content. The system can include a computer processor and a video extraction and inference engine service executing on the computer processor and including functionality to obtain a video component and an audio component of a media item, analyze the video component to select a subset of frames, perform optical character recognition (OCR) on the selected subset of frames to generate raw OCR text, process the raw OCR text using a natural language processor to generate processed OCR text, and perform feature extraction on the processed OCR text to generate a first set of feature vectors representing the video component; an audio extraction and inference engine including functionality to transcribe the audio component to generate transcribed audio text, and perform feature extraction on the transcribed audio text to generate a second set of feature vectors representing the audio component; and a classification model serving engine including functionality to execute a classification-based machine learning model based at least partially on the two sets of feature vectors to generate a binary inference indicating the likelihood of the media item being associated with a predefined classification.

In general, in one aspect, embodiments relate to a method for classifying media content. The method can include: (i) obtaining a video component and an audio component of a media item, (ii) sampling the video component to select a subset of frames, (iii) performing optical character recognition on the subset of frames to generate raw OCR text, (iv) processing the raw OCR text using a natural language processor to generate processed OCR text, (v) transcribing the audio component to generate transcribed audio text, (vi) performing feature extraction on both the processed OCR text and the transcribed audio text to generate respective sets of feature vectors, and (vii) executing, by a computer processor, a classification-based machine learning model on the feature vectors to generate a binary inference indicating the likelihood of the media item being associated with a predefined classification.

In general, in one aspect, embodiments relate to a non-transitory computer-readable storage medium having instructions for classifying media content. The instructions are configured to execute on at least one computer processor to enable the computer processor to: (i) obtain a video component and an audio component of a media item, (ii) analyze the video component to select a subset of frames, (iii) perform optical character recognition on the subset of frames to generate raw OCR text, (iv) process the raw OCR text using a natural language processor to generate processed OCR text, (v) transcribe the audio component to generate transcribed audio text, (vi) perform feature extraction on both the processed OCR text and the transcribed audio text to generate respective sets of feature vectors, and (vii) execute a classification-based machine learning model on the feature vectors to generate a binary inference indicating the likelihood of the media item being associated with a predefined classification.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

DETAILED DESCRIPTION

Figure 1A:
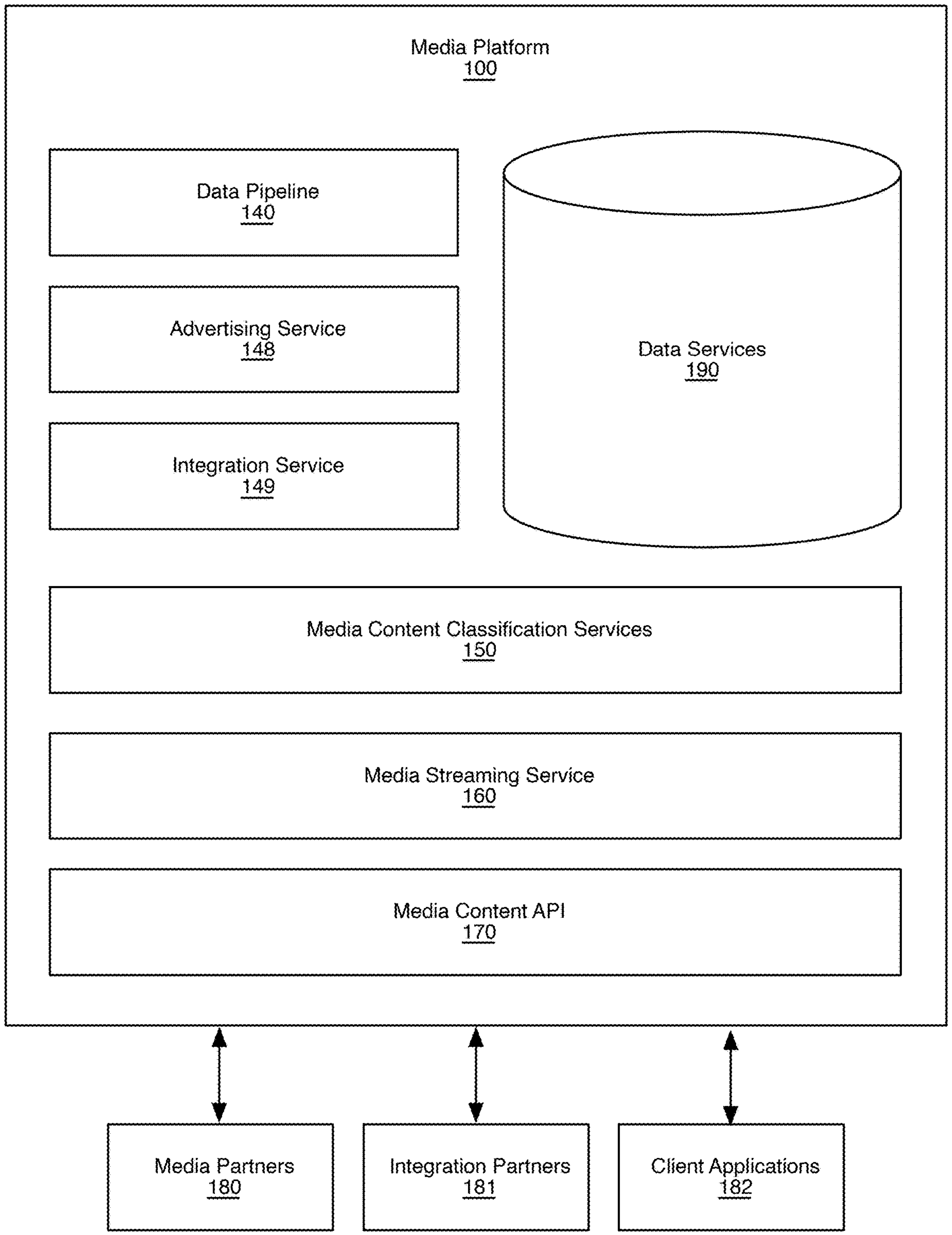
FIGS. 1A-1D show schematic diagrams of a media platform, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It will be apparent to one of ordinary skill in the art that the invention can be practiced without these specific details. In other instances, well-known features have not been described in detail to avoid unnecessarily complicating the description.

In general, embodiments of the present disclosure provide methods and systems for performing classification of media items. Various aspects of the media item may be analyzed sequentially or in parallel to generate one or more inputs for a classification system, optionally including a machine learning model trained and optimized to perform classification of media items according to one or more classification types. Inputs to the classification system may include, for example, representation of one or more audio components, speech components, video components, and/or metadata or attribute information associated with the media item. The classification system utilizes the inputs to programmatically generate a classification of the media item. The resulting classification may be utilized to perform intelligent search, relevance, advertising, and other media-related functionality, ensuring an improved media consumption experience for end-viewers.

The systems and methods disclosed in the present disclosure include functionality relating to media classification and related functionality using various types of media items. For exemplary purposes, though many of the foregoing systems and processes are described in the context of a streaming advertisement media item, they can be performed on a variety of different media types and formats, including audio-only (music/speech/nature/scientific), television shows, video games, social media posts, and any other media content served to one or more audiences for which it may be desirable to perform classification of the media item.

FIG. 1A shows a media platform 100, media partners 160, integration partners 165, and client applications 170, in accordance with one or more embodiments. As shown in FIG. 1A, the media platform 100 has multiple components including a data pipeline 140, an advertising service 148, an integration service 149, data services 190, media content classification services 150, a media streaming service 160, a media content application programming interface (API) 170. Various components of the media platform 100 can be located on the same device (e.g., a server, mainframe, a virtual compute resource residing in a virtual private cloud (VPC), a desktop Personal Computer (PC), laptop, mobile device, and any other device) or can be located on separate devices connected by a network (e.g., a local area network (LAN), wide area network (WAN), the Internet, etc.). Those skilled in the art will appreciate that there can be more than one of each separate component running on a device, as well as any combination of these components within a given embodiment.

The arrangement of the components and their corresponding architectural design are depicted as being distinct and separate for illustrative purposes only. Many of these components can be implemented within the same binary executable, containerized application, virtual machine, pod, or container orchestration cluster. Performance, cost, and application constraints can dictate modifications to the architecture without compromising function of the depicted systems and processes.

In one or more embodiments, the media platform 100 is a platform for facilitating analysis, streaming, serving, and/or generation of media-related content. For example, the media platform 100 may store or be operatively connected to services storing millions of media items such as movies, user-generated videos, music, audio books, and any other type of media content. The media content may be provided for viewing by end users of a video or audio streaming service (e.g., media streaming service 160), for example. Media services provided by the media platform 100 can include, but are not limited to, advertising media services, content streaming, preview or user-generated content generation and streaming, and other functionality disclosed herein.

In one or more embodiments of the invention, the media platform 100 is a technology platform including multiple software services executing on different novel combinations of commodity and/or specialized hardware devices. The components of the media platform 100, in the non-limiting example of FIG. 1A, are software services implemented as containerized applications executing in a cloud environment. The data pipeline 140 and media content classification services 150 and related components can be implemented using specialized hardware to enable parallelized analysis and performance. Other architectures can be utilized in accordance with the described embodiments.

In one or more embodiments of the invention, the data pipeline 140 and media content classification services 150, the advertising service 148, the integration service 149, the media streaming service 160, and the media content application programming interface (API) 170 are software services or collections of software services configured to communicate both internally and externally of the media platform 100, to implement one or more of the functionalities described herein.

The systems described in the present disclosure may depict communication and the exchange of information between components using directional and bidirectional lines. Neither is intended to convey exclusive directionality (or lack thereof), and in some cases components are configured to communicate despite having no such depiction in the corresponding figures. Thus, the depiction of these components is intended to be exemplary and non-limiting. For example, one or more of the components of the media platform 100 may be communicatively coupled via a distributed computing system, a cloud computing system, or a networked computer system communicating via the Internet.

In one or more embodiments of the invention, the media streaming service 160 manages and/or delivers media content to end-user devices (e.g., by fetching media files from storage and dynamically, adjusting streaming quality based on network conditions, etc.). For example, a user selecting a video may trigger the service 160 to retrieve the video from the media repository 191 and stream it in the highest quality available, adjusting as needed to maintain smooth playback. This service can be incorporated into various systems, such as online streaming platforms, to enhance media delivery and user experience.

In one or more embodiments of the invention, the media content API 170 provides programmable interfaces for external systems to interact with the media platform 100, enabling operations such as uploading media, querying metadata, and managing playback. For instance, a content provider or advertising network might use the API to upload a new video and its metadata, which the API then processes and stores in the media repository. The API facilitates integration with third-party applications, making it suitable for use in online streaming platforms and other content classification applications.

In one or more embodiments of the invention, the advertising service 148 manages the selection, insertion, and tracking of advertisements within media streams. By leveraging user data to target ads, dynamically placing them within content, and collecting performance metrics, the service ensures relevant and effective advertising. For example, a user watching a video might see targeted ads inserted at designated points, with the service tracking impressions and interactions. This component can be integrated into realtime bidding platforms or other applications requiring sophisticated ad management.

In one or more embodiments of the invention, the integration service 149 facilitates seamless interaction between the media platform and external systems, supporting data ingestion, export, and real-time synchronization. For example, the service 149 can be configured to import media content and metadata from a third-party content management system.

Media Content Classification Overview

Figure 1B:
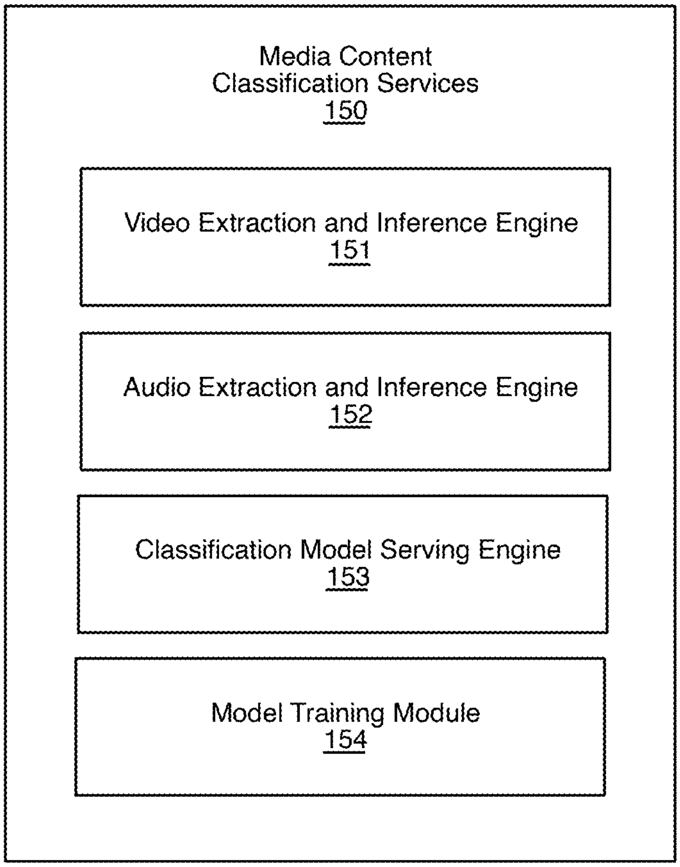

FIG. 1B shows the media content classification services 150, in accordance with one or more embodiments. As shown in FIG. 1B, the media content classification services 150 has multiple components including a video extraction and inference engine 151, an audio extraction and inference engine 152, a classification model serving engine 153, and a model training module 154. Those skilled in the art will appreciate that there can be more than one of each separate component running on a device, as well as any combination of these components within a given embodiment.

In one or more embodiments of the invention, the media content classification services 150 enables classification of media items, particularly in the context of media streaming. The classification model serving engine 153 includes functionality to analyze media items (e.g., video/audio components and metadata of a media item), to infer a classification type. The media platform 100 includes features for utilizing the inferred type to enhance content search, relevance, and consumption experiences, in accordance with various embodiments of the invention.

Data Pipeline

Figure 1C:
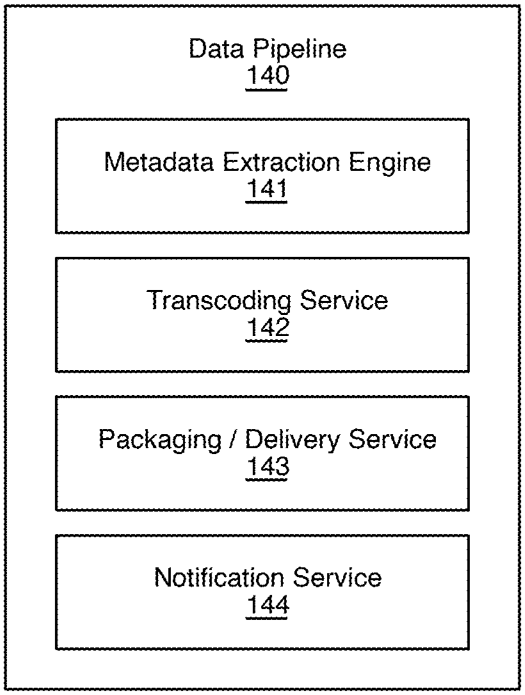

FIG. 1C shows the data pipeline 140, in accordance with one or more embodiments. As shown in FIG. 1C, the data pipeline 140 has multiple components including a metadata extraction engine 141, a transcoding service 142, a packaging/delivery service 143, and a notification service 144. Those skilled in the art will appreciate that there can be more than one of each separate component running on a device, as well as any combination of these components within a given embodiment.

In one or more embodiments of the invention, the data pipeline 140 orchestrates the flow and processing of media content from ingestion to delivery. The data pipeline 140 encompasses multiple services, each responsible for specific aspects of media processing. These services include a metadata extraction engine 141, a transcoding service 142, a packaging/delivery service 143, and a notification service 144.

In one or more embodiments of the invention, the metadata extraction engine 141 is configured to extract metadata from media items. Metadata can include, but is not limited to, information such as title, description, duration, format, resolution, and codec details. The metadata extraction engine 141 analyzes the media file headers and embedded metadata streams to gather this information. In one or more embodiments of the invention, the metadata extraction engine 141 utilizes libraries such as FFmpeg or MediaInfo to parse the media files. For instance, when a media item in MP4 format is ingested, the engine 141 may be configured to read the file headers and extract details like codec type (H.264 for video, AAC for audio), resolution (1920×1080), and duration (e.g., 120 seconds).

In one or more embodiments of the invention, the transcoding service 142 is responsible for converting media items into different formats and resolutions suitable for various delivery requirements. This service ensures that media content is available in the optimal format for playback on different devices and platforms. The transcoding service 142 may be configured to decode the input media file and re-encode it into the desired output formats. It supports multiple codecs and resolutions, enabling the creation of versions such as 1080p, 720p, and 480p in formats like MP4, WebM, and AVI.

In one or more embodiments of the invention, the packaging/delivery service 143 prepares media content for distribution and manages the delivery process to end-users. This service ensures that media items are correctly packaged, including the creation of necessary streaming manifests and packaging formats. In one embodiment, the packaging/delivery service 143 can create adaptive bitrate streaming packages using technologies such as HLS (HTTP Live Streaming) and DASH (Dynamic Adaptive Streaming over HTTP). The service 143 may be configured to generate playlist files (e.g., .m3u8 for HLS) and segment files that allow for adaptive streaming based on the user's network conditions.

In one or more embodiments of the invention, the notification service 144 handles the generation and distribution of notifications related to media processing events. This service ensures that stakeholders are informed about the status of media items throughout the processing pipeline. The notification service 144 can use messaging protocols such as SMTP for email notifications, HTTP for webhooks, and message queues like RabbitMQ or Kafka for real-time event streaming. Notifications can be triggered by events such as successful ingestion, completion of transcoding, and readiness for delivery.

Media Content Classification Services 150

In one or more embodiments of the invention, the media content classification services 150 include functionality to obtain a video component and an audio component of a media item. This process is facilitated by the video extraction and inference engine 151 and the audio extraction and inference engine 152.

The system 100 is configured to receive a media item, which can include but is not limited to advertisements, long-form videos, short clips, and trailers. The media item is initially processed by the data pipeline 140, specifically by the transcoding service 142, which decodes the media item into its constituent video and audio streams. These streams are then stored in the media repository 191 for further analysis.

In one or more embodiments of the invention, the video extraction and inference engine 151 accesses the media repository 191 and retrieves the video stream associated with the media item. Similarly, the audio extraction and inference engine 152 retrieves the corresponding audio stream. The media item, stored in formats such as MP4, MKV, or AVI, is demultiplexed to separate the video and audio components.

For example, consider a media item in MP4 format. The transcoding service 142 decodes the MP4 file to separate the H.264 encoded video stream and the AAC encoded audio stream. These streams are then stored in the media repository 191, from where the video extraction and inference engine 151 and the audio extraction and inference engine 152 can retrieve them for further processing.

Data Services

Figure 1D:
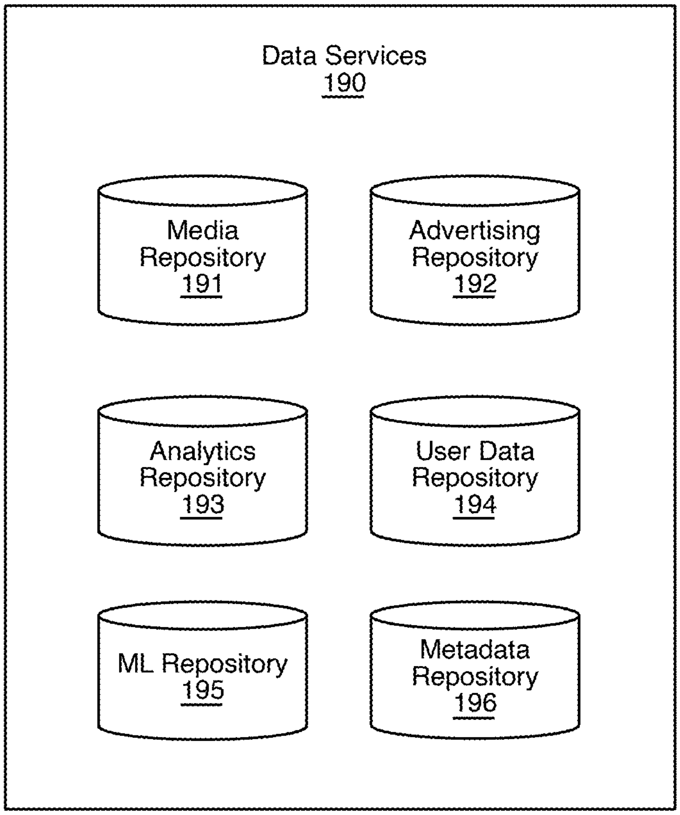

FIG. 1D shows a collection of data services 190, in accordance with one or more embodiments. As shown in FIG. 1D, the data services 190 include a media repository 191, an advertising repository 192, an analytics repository 193, a user data repository 194, a machine learning (ML) repository 195, and a metadata repository 196. Various components of the data services 190 can be located on the same device (e.g., a server, mainframe, virtual server in a cloud environment, and any other device) or can be located on separate devices connected by a network (e.g., a local area network (LAN), the Internet, a virtual private cloud, etc.). Those skilled in the art will appreciate that there can be more than one of each separate component/service running on a device, as well as any combination of these components/services within a given embodiment.

In one or more embodiments of the invention, each repository (191, 192, 193, 194, 195, 196) of data services 190 includes both business logic and/or storage functionality. For purposes of this disclosure, the terms "repository" and "store" may refer to a storage system, database, database management system (DBMS), or other storage related technology, including persistent or non-persistent data stores, in accordance with various embodiments of the invention.

In one or more embodiments of the invention, each repository includes both persistent and non-persistent storage systems, as well as application logic configured to enable performant storage, retrieval, and transformation of data to enable the functionality described herein. Non-persistent storage such as Redis, Memcached, and an in-memory data store can be utilized to cache data in order to increase performance of frequently accessed data and reduce the latency of requests.

In one or more embodiments of the invention, the media repository 191 includes functionality to store media items. Media items can include both source media items, advertising media items, and derived media items such as previews or clips, and can comprise media types and file formats of various types. Examples of media items can include, but are not limited to, movies, television shows, series, episodes, video episodes, podcasts, music, audiobooks, documentaries, concerts, live event recordings, news broadcasts, educational content, instructional videos, sports events, video blogs (vlogs), reality shows, animations, short films, trailers, behind-the-scenes footage, interviews, and user-generated content. Each of these media items can be stored, categorized, and retrieved in multiple formats such as MP4, AVI, WMV, MOV, MP3, WAV, FLAC, and others.

In one or more embodiments of the invention, the advertising repository 192 includes functionality to store advertising content. The advertising content may optionally correspond to a source media item in the media repository 191. Advertising content within the repository can include various formats such as traditional commercial spots, interactive ads, sponsored content, banner ads, product placements, preroll and midroll video segments, overlay advertisements, branded graphics, and native advertising. These advertising formats can encompass a range of file types including, but not limited to, MPEG, MP4, AVI, MOV, GIF, PNG, JPEG, and HTML5 packages. The advertising repository 192 is engineered to categorize and manage these items based on metadata such as target demographics, content relevance, viewer preferences, engagement metrics, and advertising campaign parameters. In one or more embodiments of the invention, this enables the advertising service 140 to perform precise ad placement, ensuring that advertising content is appropriately matched to viewer profiles and media content types, thereby optimizing the advertising efficacy and viewer experience.

In one or more embodiments of the invention, the analytics repository 193 includes functionality to facilitate the functionality of the platform 100 by storing and organizing a wide array of analytics data relevant to the classification of media content. For example, the analytics repository 193 may be configured to store metadata produced during the audio analysis phase and/or the video analysis phase. The types of data stored in the analytics repository 193 can include, but are not limited to, JSON-formatted metadata detailing audio loudness, speech detection, language identification, instances of silence, and frequency component analysis of each channel. In one or more embodiments of the invention, this repository may serve not only as a structured store of data but also as a reference database that the media content classification services 150 utilize to perform classification and related functions.

In one or more embodiments of the invention, the user data repository 194 includes functionality to store user data. User data may include, but is not limited to, user preferences for audio/video channels, language selections, and desired service types, which can inform features such as content discovery, search and relevance, and other elements of the system that may benefit or be dependent upon classification of media items by the media content classification services 150. In one example, if a particular user frequently selects a desired language, the repository may store this preference data. Subsequently, the media content classification services 150 leverage this information to prioritize analysis or delivery of similar layouts or languages when evaluating new content for that user, thus enhancing the personalization of the media experience.

The data stored within this repository may range from simple user identifiers and associated media preferences to more complex behavioral patterns, such as the frequency of changes between language selections or service types while consuming media. This data, potentially stored in formats such as JSON, XML, or relational databases, may also be utilized to enable the media content classification services 150 to refine its algorithms and improve its accuracy in media classification, thereby streamlining the content preparation process for delivery to the end-viewer and minimizing the likelihood of a poor consumption experience.

In one or more embodiments of the invention, the machine learning repository 195 is configured to function as a storehouse for machine learning models and associated datasets pertinent to the operation of the media content classification services 150 and related services. This repository 195 includes functionality to retain and manage a diverse array of data types and structures used for training, validating, and deploying machine learning models that enhance media analysis capabilities. The repository 195 may be configured to store datasets comprising labeled audio samples that define channel attributes, spoken languages, audio service types, and more. These datasets may serve as training material for supervised learning models such as convolutional neural networks, recurrent neural networks, and more.

In one or more embodiments of the invention, in support of the media content classification services 150 objectives, the machine learning repository 195 facilitates functions such as storing preprocessed and annotated media files used for model training, where each file is associated with metadata describing media content. The machine learning repository 195 may be configured to store a variety of machine learning and related data, including but not limited to, model parameters, hyperparameters, and architecture configurations, logging performance metrics of models on validation sets to enable evaluation and comparison between different model iterations, and deployment packages that encapsulate trained models and inference code, ready to be deployed into the production environment.

In accordance with one or more embodiments of the invention, metadata repository 196 includes functionality to catalog, store, and facilitate access to a range of metadata. For example, the repository 196 may be configured to store JSON-formatted metadata outcomes from the media analysis process. The metadata may encompass a spectrum of media attributes including, but not limited to, channel loudness, dialog detection, speech information, language identification, and more, all usable for determining classification types, and a variety of other functions of the media platform 100.

Video Frame Selection

In one or more embodiments of the invention, the video frame selection process involves selecting a subset of frames from the video component of a media item to facilitate efficient analysis, such as optical character recognition (OCR) and feature extraction. The frame selection can be performed in a variety of ways, ranging from simple techniques like random or fixed-interval sampling to more sophisticated methods involving analysis of each frame or the usage of machine learning models.

The video frame selection process is designed to reduce the volume of data while retaining the most informative frames. This is essential for optimizing the subsequent processing stages, including OCR and feature extraction. The selection techniques can be broadly categorized into methods such as random sampling, fixed-interval sampling, and intelligent sampling. In random sampling, frames are selected at random intervals throughout the video. This method is straightforward and ensures a diverse set of frames, but may miss critical content. In fixed-interval sampling, frames are selected at regular intervals, such as one frame per second. This method is simple and predictable but may include redundant frames if the content changes slowly. Intelligent sampling involves selecting frames based on the analysis of each frame's content, using metrics such as clarity, brightness, motion, or the presence of text. Machine learning models can also be employed to identify key frames that are likely to contain significant information.

In one or more embodiments of the invention, the video extraction and inference engine 151 is configured to analyze frames from the end of the video to the beginning. This approach is based on the observation that the end of a video (e.g., in the advertising space) often contains dense or summary information. The process involves extracting and analyzing frames in reverse chronological order. This method ensures that crucial summary information is captured early in the OCR process, which can be particularly useful for classification tasks.

In one or more embodiments of the invention, the video extraction and inference engine 151 includes functionality to analyze frames until a threshold amount of OCR content is obtained. Thus, rather than selecting a fixed number of frames, the video extraction and inference engine 151 may be configured to work in a specified direction or according to a specified order (e.g., one frame per second, reverse-chronologically) until the threshold number of frames or OCR-recognized text is identified. In one embodiment, the video extraction and inference engine 151 discards frames that fail to meet a minimum amount of OCR content from further analysis. Thus, in meeting the threshold requirement, the video extraction and inference engine 151 may continue to analyze frames until a threshold number of qualifying frames and/or a threshold quantity of OCR text is recognized.

Random sampling involves selecting frames at random time points within the video duration. This method is useful when there is no prior knowledge of the content distribution. For instance, in a 60-second video, the video extraction and inference engine 151 might randomly select 10 frames for analysis. Fixed-interval sampling involves selecting frames at uniform time intervals. For example, in a video with a duration of 60 seconds and a frame rate of 30 fps, one frame is selected every second, resulting in 60 frames. Intelligent sampling, on the other hand, can include clarity-based sampling where each frame is analyzed for clarity metrics like edge sharpness and contrast, with the least blurry frames being selected. It can also involve motion-based sampling where motion detection algorithms identify frames where significant changes occur, and text presence sampling that employs pre-OCR techniques to detect frames likely containing text.

For example, in a fixed-interval sampling process, a media item like commercial.mp4 with a duration of 60 seconds is divided into 1-second intervals by the video extraction and inference engine 151, selecting one frame from each interval and resulting in 60 frames. The engine 151 then uses the selected frames for OCR processing. In an intelligent sampling process, the video extraction and inference engine 151 analyzes a media item such as "movie_trailer.mp4" with a duration of 120 seconds using a machine learning model trained to identify key frames with significant text or visual content. The model analyzes the video and selects 30 frames deemed most informative based on learned criteria, which are then subjected to OCR and further analysis by the video extraction and inference engine 151. In a clarity-based sampling example, the video extraction and inference engine 151 analyzes a media item such as "news_clip.mp4" using an algorithm to measure the sharpness of each frame. The engine 151 selects the sharpest frame from each 5-second interval, resulting in 24 frames from a 120-second video. The engine 151 then processes the selected frames for text extraction via OCR. In one or more embodiments of the invention, the video extraction and inference engine 151 is configured to utilize any combination of these selection techniques based on the requirements and constraints of the desired application.

In one or more embodiments of the invention, the video extraction and inference engine 151 may include an optional functionality for more sophisticated key frame selection. Instead of uniform sampling, key frame selection involves identifying and selecting frames that are most likely to contain significant textual information.

In one or more embodiments of the invention, the video extraction and inference engine 151 utilizes a machine learning model to predict the importance of frames based on training data. The model is configured to classify frames based on their relevance to the task, such as identifying frames with high information content. This approach ensures that the most significant frames are selected for subsequent processing, optimizing the efficiency and accuracy of tasks like optical character recognition (OCR) and feature extraction.

In one or more embodiments of the invention, the machine learning model for frame selection is designed to take specific inputs and produce outputs that determine the importance of each frame. The inputs to the model are feature vectors extracted from each frame of the video. These feature vectors represent various attributes of the frames, such as color histograms, edge density, texture features, motion vectors, and any pre-detected text or objects within the frame. The feature vectors provide a comprehensive description of the visual and contextual content of each frame, allowing the model to make informed predictions about their importance.

In one or more embodiments of the invention, the video extraction and inference engine 151 feeds these feature vectors into the machine learning model, which can be a neural network, support vector machine, or another suitable classifier. The machine learning model processes these feature vectors and outputs a relevance score for each frame. The relevance score is a numeric value indicating the importance of the frame for the task at hand. Higher scores represent higher importance, and these scores are used to select the top frames for further processing. The output of the machine learning model is a set of relevance scores, one for each frame. These scores are numeric values, for example, ranging from 0 to 1, where higher values indicate higher relevance. The frames with the highest scores are selected for further processing.

Optical Character Recognition

In one or more embodiments of the invention, the video extraction and inference engine 151 includes functionality to perform optical character recognition (OCR) on the selected subset of frames to generate raw OCR text. This process involves analyzing the visual content of the frames to detect and extract textual information.

The video extraction and inference engine 151 begins the OCR process with the input of frames selected through the frame selection process. Each frame is processed individually to detect text regions and convert them into a machine-readable format. The video extraction and inference engine 151 scans each frame (e.g., pixel by pixel), identifying patterns that correspond to alphanumeric characters. The engine 151 then applies character recognition algorithms to convert these patterns into raw text.

For example, consider a frame from a political advertisement containing the text "Vote for John Doe." The video extraction and inference engine 151 processes the frame and detects the text region. It then recognizes the characters and outputs the raw OCR text as "Vote for John Doe."

In one or more embodiments of the invention, the video extraction and inference engine 151 performs one or more of the following steps as part of the OCR process:

- Preprocessing: Enhancing the frame quality by adjusting brightness, contrast, and removing noise to improve text detection accuracy.
- Text Detection: Identifying regions within the frame that contain text using techniques such as edge detection and contour analysis.
- Character Recognition: Applying trained models to recognize and convert the detected text regions into alphanumeric characters.
- Postprocessing: Cleaning up the recognized text by correcting common OCR errors and formatting the output.

In an example where the system processes a frame with the text "Election Day: November 3rd," the video extraction and inference engine 151 detects the text region and outputs the raw OCR text as "Election Day: November 3rd."

In one or more embodiments of the invention, the video extraction and inference engine 151 includes functionality to process the raw OCR text using a natural language processor (NLP) to generate processed OCR text. This step involves refining the raw text output from the OCR process to enhance its quality and usability for further analysis.

The raw OCR text often contains errors due to factors such as low image quality, complex backgrounds, or unusual fonts. The NLP system addresses these issues by applying various text processing techniques. The video extraction and inference engine 151 can be configured to apply a cleaning function which performs one or more tasks such as spell checking, grammar correction, and/or text normalization. In one or more embodiments of the invention, the engine 151 performs one or more of the following to process raw OCR text:

- Spell Checking: Identifying and correcting misspelled words using a dictionary-based approach.
- Grammar Correction: Fixing grammatical errors and restructuring sentences to improve readability.
- Text Normalization: Converting text to a standard format, including the correction of common OCR errors like "l" being recognized as "1" or vice versa.
- Contextual Analysis: Using NLP models to understand the context and semantics of the text, making corrections based on the overall meaning. For example, multiple line sentences can frequently appear out of order in raw OCR text. The video extraction and inference engine 151 can be configured to correct these common errors in order to provide a comprehensible input for subsequent stages of the analysis.

In one example, the raw OCR text "Vote for J0hn D0e" contains errors where "0" is incorrectly recognized instead of "o." The video extraction and inference engine 151 processes this text, corrects the errors, and generates the processed OCR text "Vote for John Doe."

Another example involves the raw OCR text "Electon Day: November 3rd," where there are misspellings and formatting issues. The video extraction and inference engine 151 corrects these errors, resulting in the processed OCR text "Election Day: November 3rd."

By performing OCR on the subset of frames and processing the raw OCR text using a natural language processor, the video extraction and inference engine 151 ensures that the extracted text is accurate and useful for further analysis. This approach enhances the overall effectiveness of the media content classification system.

Figure 2A:
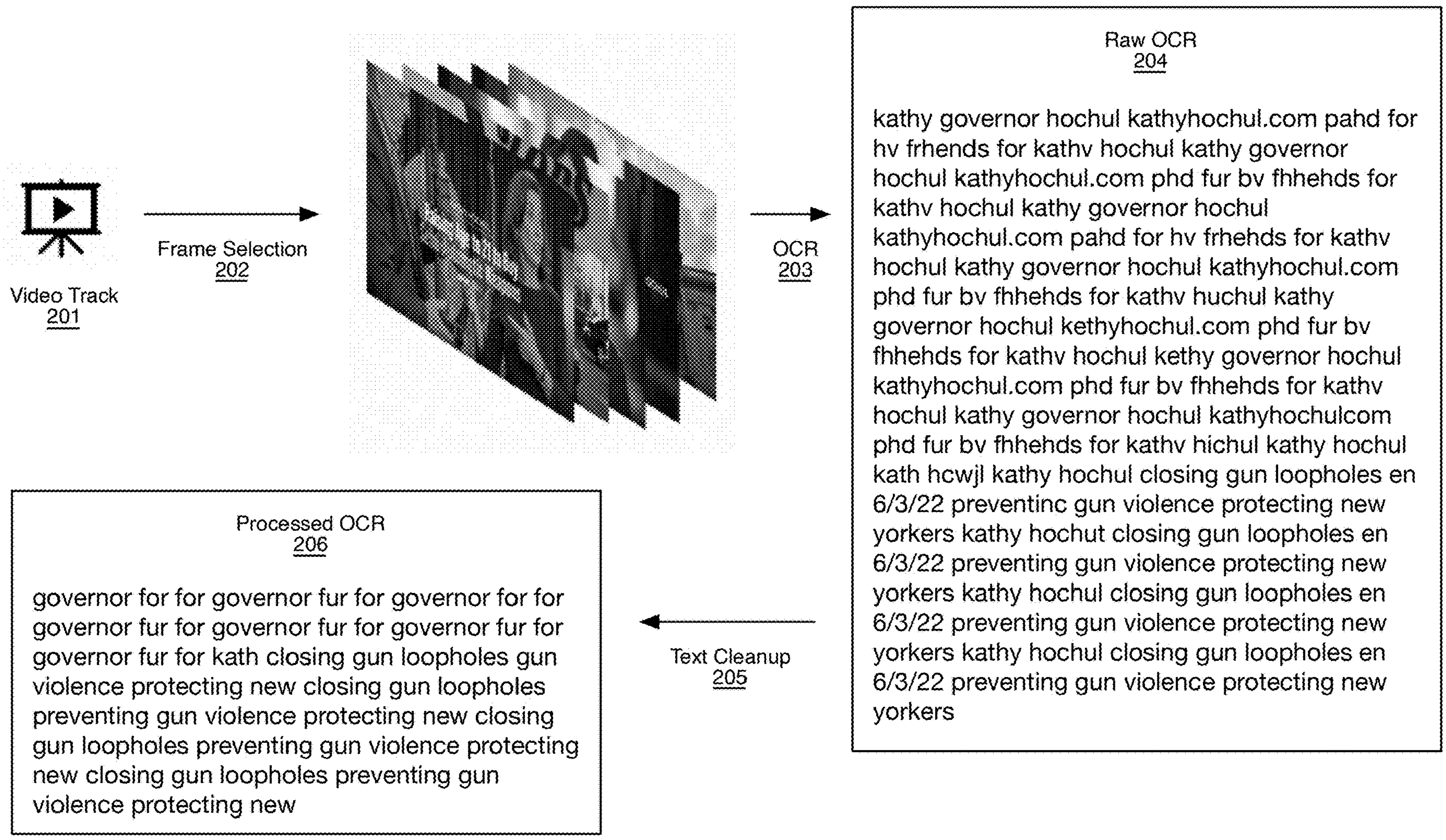
FIG. 2A-2C show flowcharts depicting execution of a classification system involving video and audio processes, in accordance with one or more embodiments.

FIG. 2A depicts a flow diagram for optical character recognition and preprocessing of OCR data for a classification system, in accordance with one or more embodiments of the invention. As depicted in FIG. 2A, the process begins by obtaining a video track of a media item 201, performs frame selection 202, performs optical character recognition 203 to produce raw OCR text 204, and then applies a cleaning function 205 to generate processed OCR text 206. The process depicted by FIG. 2A can include any number of optional variations, and may be parallelized or performed in a variety of different orders to achieve the required output without limitation.

Audio Transcription

In one or more embodiments of the invention, the audio extraction and inference engine 152 includes functionality to transcribe the audio component of a media item to generate transcribed audio text. This process involves converting spoken language within the audio track of the media item into a textual format that can be used for further analysis, such as feature extraction and classification.

The transcription process begins with the extraction of the audio component from the media item. In one or more embodiments of the invention, the audio extraction and inference engine 152 includes functionality to process the audio to enhance its quality and ensure clarity, which may include noise reduction and normalization techniques. Once the audio is prepared, the audio extraction and inference engine 152 segments it into manageable chunks that can be efficiently processed. In one or more embodiments, this segmentation can be based on fixed time intervals or detected pauses in speech to optimize accuracy.

In one or more embodiments of the invention, the audio extraction and inference engine 152 utilizes an automatic speech recognition (ASR) machine learning model to convert audio signals into text. This model is trained on large datasets and can handle various accents, dialects, and languages, ensuring accurate transcription across diverse media content.

In one or more embodiments of the invention, a transcription engine of the audio extraction and inference engine 152 processes each audio segment, converting the spoken words into text. This may include one or more of the following processes:

- Audio Preprocessing: This step includes filtering out background noise, normalizing volume levels, and removing non-speech segments.
- Segmentation: The audio signal is divided into smaller segments, typically 5-second long intervals with a slight overlap, to ensure smooth transcription.
- Feature Extraction: Acoustic features such as Mel-frequency cepstral coefficients (MFCCs) are extracted from the audio segments.
- Speech Recognition: The ASR system processes the acoustic features using neural networks, recognizing phonemes, words, and sentences to generate raw transcribed text.
- Postprocessing: The raw text is cleaned and formatted, correcting common transcription errors and ensuring proper punctuation and capitalization.

In one or more embodiments of the invention, the audio extraction and inference engine 152 includes functionality to prune out music and other non-speech audio components from the audio track. This ensures that the speech-to-text process focuses solely on spoken content, improving the accuracy of the transcription.

The music pruning process involves analyzing the audio signal to identify and separate speech from non-speech elements using audio signal processing techniques. These techniques can include frequency analysis and machine learning models trained to distinguish between speech and music.

In one or more embodiments of the invention, the audio extraction and inference engine 152 includes functionality for post-processing the transcribed text output to remove numbers and perform one-letter extraction. This step refines the transcribed text, enhancing its suitability for subsequent classification tasks. The system scans the transcribed text for numerical characters and removes them. This is particularly useful in scenarios where numbers do not contribute to the classification task and may introduce noise into the data. The engine 152 may also identify and remove isolated single-letter words, which are often artifacts of transcription errors or non-informative elements in the context of classification.

In one or more embodiments of the invention, the audio extraction and inference engine 152 includes functionality to support multilingual speech-to-text transcription. This functionality enables the system to accurately transcribe spoken content from audio tracks in multiple languages, enhancing its applicability across diverse media items. The multilingual support is achieved by integrating a speech recognition model that has been pre-trained on a diverse set of languages. This model uses language detection algorithms to automatically identify the language of the spoken content and apply the appropriate transcription process.

Figure 2B:
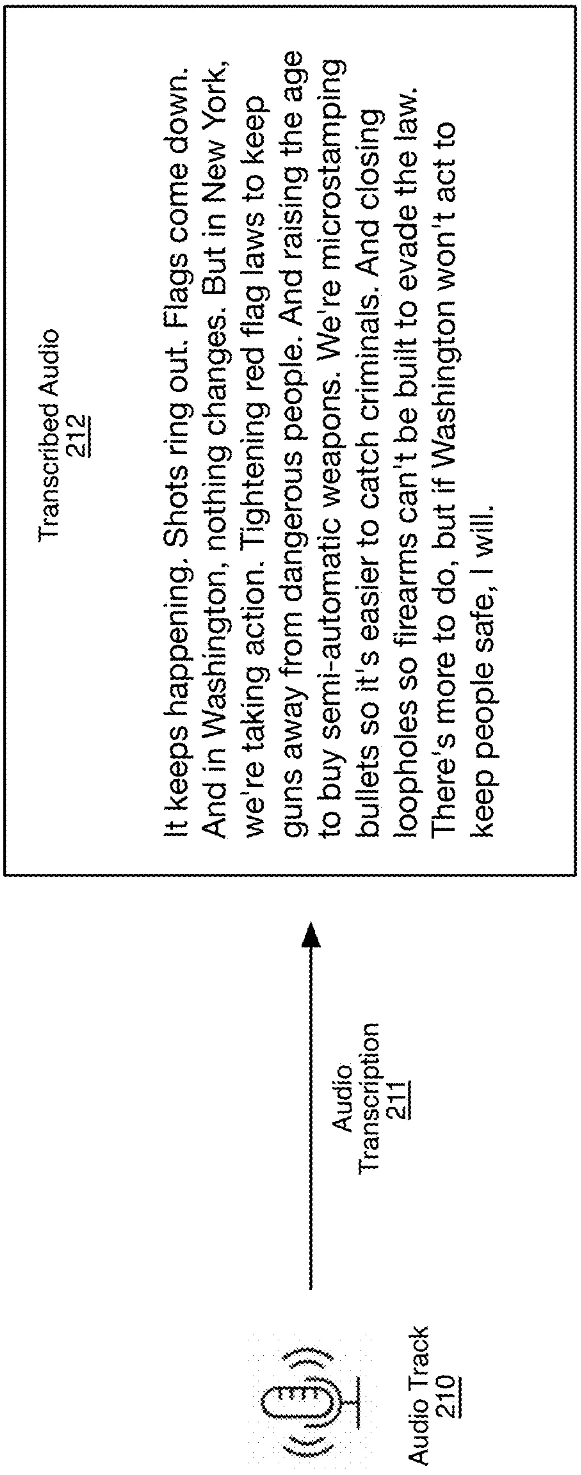

FIG. 2B depicts a flow diagram for audio transcription for a classification system, in accordance with one or more embodiments of the invention. As depicted in FIG. 2B, the process begins by obtaining an audio track of a media item 210 and performs audio transcription on the audio track 211 to generate a transcribed audio 212. The process depicted by FIG. 2B can include any number of optional variations, and may be parallelized or performed in a variety of different orders to achieve the required output without limitation.

Feature Extraction/Fusion

In one or more embodiments of the invention, the media content classification services 150 include functionality to perform feature extraction on both the processed OCR text and the transcribed audio text to generate respective sets of feature vectors. This process transforms the textual data into numerical representations that can be used by machine learning models for classification tasks.

Feature extraction is a process by which textual data is transformed into numerical features that capture the essential characteristics of the text. This is a crucial step in preparing the data for machine learning algorithms. The processed OCR text, derived from the video component, and the transcribed audio text, derived from the audio component, are both subjected to feature extraction. The result is a set of feature vectors that numerically represent the content of the media item.

The feature extraction process involves several stages. Initially, the processed OCR text and the transcribed audio text are tokenized, which means that the text is split into individual words or tokens. Subsequently, these tokens are converted into feature vectors using techniques such as embeddings or more complex models like transformers.

Tokenization: Both the processed OCR text and transcribed audio text are split into tokens. For example, the sentence "Closing gun loopholes to prevent gun violence" is tokenized into ["Closing", "gun", "loopholes", "to", "prevent", "gun", "violence"].

Embedding: Each token is converted into a numerical representation. This can be done using pre-trained word embeddings, which map each word to a high-dimensional vector. For instance, the word "gun" might be represented as a 300-dimensional vector [0.21, −0.10, 0.35, . . . , 0.03].

Transformer-Based Feature Extraction: In more advanced embodiments, a transformer model such as BERT (Bidirectional Encoder Representations from Transformers) is used. The transformer model processes the entire sequence of tokens, taking into account the context of each word, and generates contextualized embeddings. For example, the sentence "Closing gun loopholes to prevent gun violence" is input into the BERT model, which outputs a series of feature vectors, each corresponding to a token in the context of the entire sentence.

Aggregation: The feature vectors for each token are aggregated to form a single feature vector representing the entire text. This can be done through various methods such as averaging the token vectors or using the final hidden state of the transformer model. In one or more embodiments of the invention, the media content classification services 150 include functionality to perform feature fusion, which involves combining the outputs of BERT encoder feature extraction for video OCR and audio into a single feature vector set. This process integrates the distinct feature representations derived from the video and audio components of a media item into a unified representation, enhancing the accuracy and comprehensiveness of the classification model. In one or more embodiments of the invention, the media content classification services 150 include functionality to perform one or more of the following steps in order to fuse features of various different aspects of the media file into a unified representation (a "fused" feature set):

Feature Extraction: Initially, feature extraction is performed separately, e.g., on the processed OCR text from the video component and the transcribed audio text. This results in multiple distinct sets of feature vectors.

Normalization: The extracted feature vectors are normalized to ensure that they are on a comparable scale. This may involve techniques such as min-max scaling or z-score normalization.

Concatenation: The normalized feature vectors from each modality are concatenated to form a single, comprehensive feature vector. This concatenation can be performed in a straightforward manner by appending the audio feature vector to the video feature vector.

Dimensionality Reduction (Optional): In one or more embodiments of the invention, the media content classification services 150 include functionality to perform dimensionality reduction on the concatenated feature vector to reduce the computational complexity and enhance the efficiency of subsequent processing steps.

Fusion Layer: A fusion layer of the media content classification services 150, typically implemented using a neural network, further processes the concatenated feature vector to learn the interactions between the different modalities. This layer can be a simple fully connected layer or a more complex architecture depending on the application requirements.

The fused feature vectors encapsulate the semantic information of the original texts in a numerical format, making them suitable for input into machine learning models. For instance, a classification-based machine learning model can then use these feature vectors to determine the likelihood that the media item contains political content. This numerical representation enables efficient and accurate content classification, enhancing the system's ability to process and understand media items.

Figure 2C:
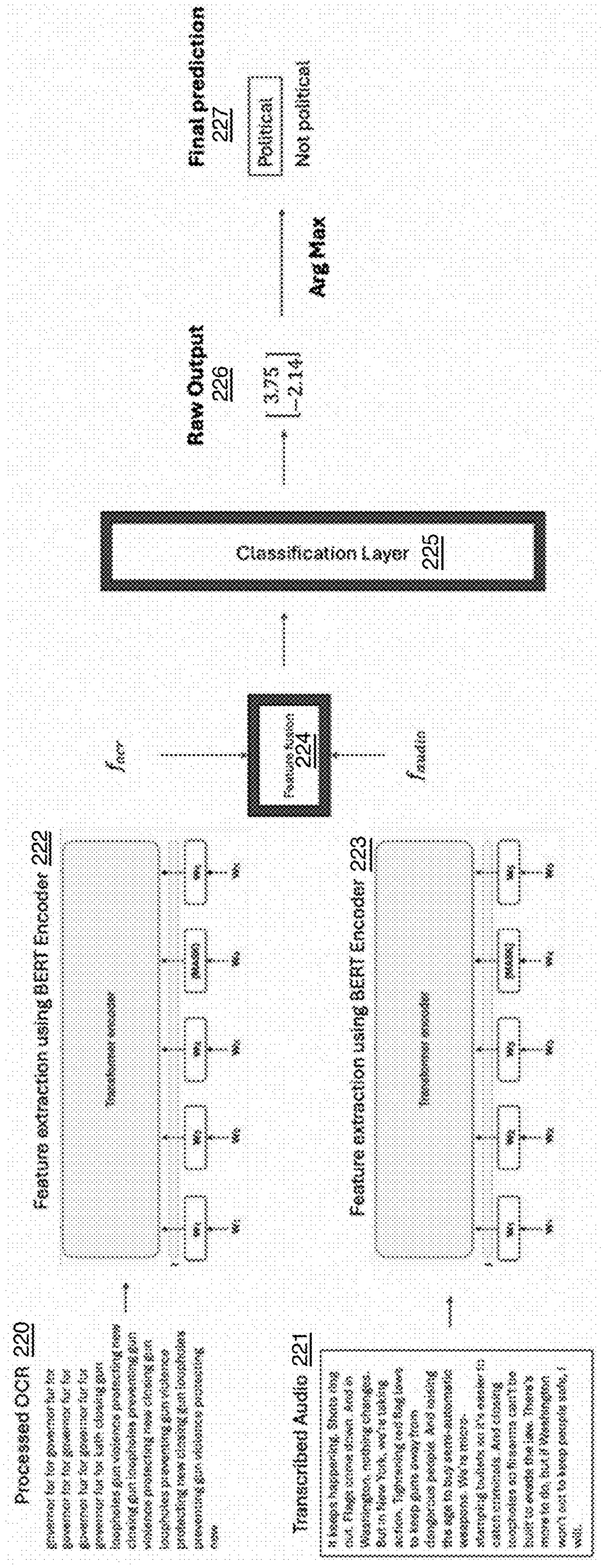

FIG. 2C depicts a flow diagram for executing a classification-based machine learning model, in accordance with one or more embodiments of the invention. As depicted in FIG. 2C, the process begins by obtaining processed OCR text 220 (e.g., as an output of the process of FIG. 2A) and transcribed audio 221 (e.g., as an output of the process of FIG. 2B). Both of these datasets are independently inputted to BERT transformer encoder models 222 and 223 with various weights and parameters to generate two distinct feature sets: focr and faudio. These two feature sets are then combined in a process of feature fusion 224 to generate a unified feature set, which is passed into the classification layer/model 225. The raw output 226 of the classification model is then analyzed to generate a final prediction 227 indicating that the media item is classified as being political. The process depicted by FIG. 2C can include any number of optional variations, and may be parallelized or performed in a variety of different orders to achieve the required output without limitation.

Multi-Stream Classification Model

In one or more embodiments of the invention, an alternative approach to feature fusion is implemented where the feature sets derived from video OCR and audio transcription are treated separately. In this approach, the media content classification services 150 leverages a multi-stream classification-based machine learning model that processes each feature set independently, thereby maintaining the distinct characteristics of each modality. This model processes the feature vectors from the video OCR and audio transcription independently, allowing the distinct characteristics of each modality to be preserved and utilized effectively in the classification process.

In one or more embodiments of the invention, the classification model serving engine 153 executes a multi-stream neural network architecture where separate branches are dedicated to processing the video and audio feature vectors. Each branch of the model independently processes its respective feature vectors through multiple layers of neural units (e.g., transformer units or other deep learning architectures) to extract high-level features. In this embodiment, the video feature vectors are input into the video branch of the multi-stream model, which processes them to generate video-based classification outputs. Similarly, the audio feature vectors are input into the audio branch, which processes them to generate audio-based classification outputs. The outputs from the video and audio branches are combined in a final decision layer. This layer aggregates the separate classification results to produce a unified binary inference indicating the likelihood of the media item being associated with a predefined classification, such as political or non-political content.

Model Serving

In one or more embodiments of the invention, the classification model serving engine 153 includes functionality to execute a classification-based machine learning model on the feature vectors to generate a binary inference indicating the likelihood of the media item being associated with a predefined classification. This process involves using feature vectors derived from the video OCR text and audio transcriptions to determine if the media item belongs to a specific category, such as political or non-political content.

The classification-based machine learning model is designed to process the feature vectors extracted from different modalities (video OCR and audio transcriptions) and generate an inference about the media item's classification. This involves using advanced machine learning algorithms, particularly those leveraging neural network architectures like transformers, to analyze the combined feature set and output a binary decision indicating the category of the media item.

In one or more embodiments, the classification model utilizes a pretrained transformer model, which has been fine-tuned for the specific classification task. The model consists of multiple layers of transformer units designed to handle complex relationships within the input data. The classification model serving engine 153 feeds the combined feature vector set into the model. The combined feature vector set may include vectors of dimensions such as 768 (for each modality) resulting in a fused vector of 1536 dimensions, for example. In one or more embodiments of the invention, the model processes the input feature vectors through its layers, applying learned weights and biases to transform the input into a set of logits. These logits represent the model's raw predictions for each possible class. In one embodiment of the invention, the logits are passed through an activation function, to generate probabilities for each class. In the case of a binary classification, the output is a pair of probabilities corresponding to the likelihood of the media item being in each of the two classes (e.g., political vs. non-political).

In one or more embodiments of the invention, the classification model serving engine 153 includes functionality to apply a threshold to the output probabilities to make a binary decision. The class with the higher probability is selected as the predicted class for the media item.

Consider an example scenario where the feature vectors have been extracted and fused as follows:

Video OCR Feature Vector: [0.10, −0.02, 0.32, . . . , 0.20] (768 dimensions)

Audio Feature Vector: [0.09, −0.01, 0.28, . . . , 0.18] (768 dimensions)

Fused Feature Vector: [0.10, −0.02, 0.32, . . . , 0.20, 0.09, −0.01, 0.28, . . . , 0.18] (1536 dimensions)

Inference Output: [0.924, 0.076]

In this example scenario, the inference output values indicate that the model predicts a 92.4% likelihood that the media item is political and a 7.6% likelihood that it is non-political. Based on the probabilities, the classification model serving engine 153 decides that the media item is political (since 0.924>0.5).

Model Training

In one or more embodiments of the invention, the model training module 154 includes functionality to perform fine-tuning of a pretrained transformer model using a specific dataset tailored to the predefined classification. The fine-tuning process adjusts the weights within the transformer model to enhance recognition of features pertinent to the predefined classification.

In one or more embodiments of the invention, the pretrained transformer model, such as a BERT (Bidirectional Encoder Representations from Transformers) model, is initially trained on a large and diverse corpus of text data to develop generalized language representations. Fine-tuning this model involves retraining it on a smaller, domain-specific dataset that reflects the specific classification task.

In one example, consider a pretrained BERT model that has been trained on the Wikipedia corpus. To fine-tune this model for political advertisement classification, a specific dataset containing labeled examples of political and non-political ads is used. This dataset might consist of 10,000 labeled examples, with 5,000 examples in each class. During fine-tuning, the model's weights are adjusted over several epochs, such as 3-5, using an optimization algorithm. The fine-tuning process aims to minimize the classification error on this specific dataset.

In one or more embodiments of the invention, the model training module 154 further includes functionality to obtain an additional classification layer, initially untrained, which is configured to output a binary classification decision. This additional layer is appended to the end of the pretrained transformer model. The additional classification layer typically consists of a dense layer with a sigmoid activation function, which outputs a probability score between 0 and 1 for each class. The parameters of this layer are randomly initialized and are trained alongside the fine-tuning of the transformer model. For example, if the transformer model's final layer outputs a feature vector of size 768, the additional classification layer might be a dense layer that takes this 768-dimensional vector as input and outputs a single probability value.

In one or more embodiments of the invention, the model training module 154 is configured to identify a training dataset including examples from each of a set of categories relevant to the predefined classification. This dataset includes both positive and negative instances to ensure balanced learning. The training dataset is curated to include a wide variety of examples that accurately represent the different categories. For a binary classification task, this means having a roughly equal number of positive (e.g., political ads) and negative (e.g., non-political ads) instances.

In one or more embodiments of the invention, the model training module 154 includes functionality to execute training of the additional classification layer. This involves adjusting the weights of the classification layer based on classification errors derived from the training dataset. In one or more embodiments of the invention, the training process involves feeding batches of training examples through the transformer model and the additional classification layer, computing the predicted probabilities, and comparing them to the true labels using a loss function. The gradients of the loss with respect to the model parameters are computed, and an optimization algorithm is used to update the weights to minimize the loss.

In one or more embodiments of the invention, the classification model serving engine 153 includes functionality to deploy the classification-based machine learning model including the transformer model trained with the additional classification layer. Deployment involves making the trained model available for inference on new data. The deployed model can be hosted on a server and accessed via the media content API 170, allowing it to process incoming media items, extract feature vectors, and generate binary classification decisions in real-time.

Monitoring

In one or more embodiments of the invention, a monitoring module (not shown) of the media content classification services 150 includes functionality to enable the system to adapt to changes in classification types over time. This adaptability is particularly useful in contexts where the nature of the content being classified may evolve, such as political content, which can change in tone, terminology, and relevant issues. To address this, the monitoring module is utilized to evaluate the performance of the classification model both programmatically and manually. When a decline in performance is detected, a new set of data is fed into the system for fine-tuning the model rather than retraining from scratch.

In one or more embodiments of the invention, the monitoring module continuously evaluates the performance of the classification-based machine learning model. This module operates by randomly sampling and assessing the classified media items to ensure the model's accuracy and relevance remain high. Upon detecting a performance decline, the system initiates a fine-tuning process using new data sets. The monitoring module is configured to randomly sample classified media items and evaluate their classification accuracy. This module can operate in both programmatic and manual modes, providing comprehensive oversight of model performance. Programmatic evaluation involves automated scripts that compare the model's output against a ground truth dataset, while manual evaluation involves human reviewers assessing the classification results for accuracy and relevance.

In one or more embodiments of the invention, the monitoring module calculates various performance metrics such as precision, recall, F1-score, and accuracy. A threshold for acceptable performance is predefined. If the metrics fall below this threshold, the system flags the model for fine-tuning. When a decline in performance is detected, the model training module 154 does not retrain the model from scratch. Instead, it fine-tunes the existing model using new data sets. Fine-tuning involves adjusting the weights of the pretrained model to improve its performance on the updated data.

In one or more embodiments of the invention, model training module 154 collects new data sets that reflect the current context and classification requirements. These data sets include recent examples of both positive and negative instances for the classification task. The new data sets are split into training and validation sets. The pretrained model is loaded, and its weights are adjusted based on the new data. Fine-tuning typically involves fewer epochs and lower learning rates compared to initial training, focusing on optimizing the model's performance on the new data.

In one or more embodiments of the invention, additional enhancements can be integrated into the monitoring and fine-tuning process. The monitoring module can include functionality to automatically collect new data sets from various sources, ensuring a continuous and up-to-date supply of relevant data for fine-tuning. The performance thresholds for triggering fine-tuning can be adaptive, adjusting based on historical performance trends and the criticality of the classification task. The monitoring module can integrate additional data modalities, such as social media trends and news articles, to enhance the relevance and comprehensiveness of the fine-tuning data sets. For high-frequency content updates, the monitoring module can implement real-time fine-tuning, allowing the model to adapt almost instantaneously to changes in the classification context.

Applications

In one or more embodiments of the invention, the system described herein is designed for the classification of media content. The system, while specifically described in the context of classifying political content, is not limited to this application. It can be applied to a variety of content types, such as advertisements, long-form videos, and other media items across different domains, including but not limited to education, healthcare, automotive, and food industries.

In one or more embodiments of the invention, in the context of educational content classification, the media content classification services 150 can be adapted to categorize media items into educational categories, identifying content based on subject matter, educational level, and target audience. For instance, the system can analyze videos to determine whether they are math tutorials, science experiments, or history lectures. The video extraction and inference engine would sample frames from the video, perform OCR to extract any on-screen text such as "Introduction to Algebra" or "Photosynthesis Process," and use NLP to process and classify the text. Similarly, the audio extraction and inference engine would transcribe spoken content, identifying key phrases like "solve for x" or "chlorophyll absorbs sunlight," and generate feature vectors for classification. The classification model serving engine would then use and/or combine these vectors to categorize the media item appropriately, enhancing the educational experience by tailoring content to specific needs.

In one or more embodiments of the invention, for healthcare content classification, the media content classification services 150 can be used to categorize healthcare-related media, focusing on recognizing medical terminology, procedures, and health tips. For example, the system might analyze a video to distinguish between general wellness advice and specific medical treatments. The video extraction and inference engine would handle visual elements such as text overlays displaying "Blood Pressure Monitoring" or "Diabetes Management Tips," while the audio extraction and inference engine would transcribe spoken medical advice or procedural instructions. By extracting relevant features from both text and audio, the classification model serving engine could accurately classify the content into categories like preventive care, chronic disease management, or emergency response.

In one or more embodiments of the invention, in the automotive sector, the media content classification services 150 can classify media items with an emphasis on brand recognition, vehicle types, and marketing messages. For instance, an advertisement for a new electric vehicle can be analyzed to highlight its focus on eco-friendliness and innovation. The video extraction and inference engine might capture frames showing logos, brand names, or distinctive car models, performing OCR to extract text like "Tesla Model 3" or "Zero Emissions." The audio extraction and inference engine would transcribe promotional messages, extracting phrases such as "electric driving experience" or "next-gen battery technology." The classification model serving engine would then use these features to classify the advertisement under categories like electric vehicles, luxury cars, or eco-friendly technology, aiding in targeted marketing efforts.

In one or more embodiments of the invention, the media content classification services 150 can also be applied to classify emotional content in media items, identifying videos that evoke specific emotions such as joy, sadness, or excitement. For example, a long-form video or movie trailer might be analyzed to determine its emotional tone. The video extraction and inference engine would sample frames to capture scenes with strong visual cues like smiling faces, tears, or high-energy action sequences, performing OCR to extract any on-screen text conveying emotional messages. Concurrently, the audio extraction and inference engine would transcribe dialogues and background music, identifying emotional expressions such as "heartwarming reunion" or "thrilling adventure." By integrating these visual and audio features, the classification model serving engine would classify the media item based on its predominant emotional content, enabling content providers to better understand and cater to audience preferences.

Figure 3:
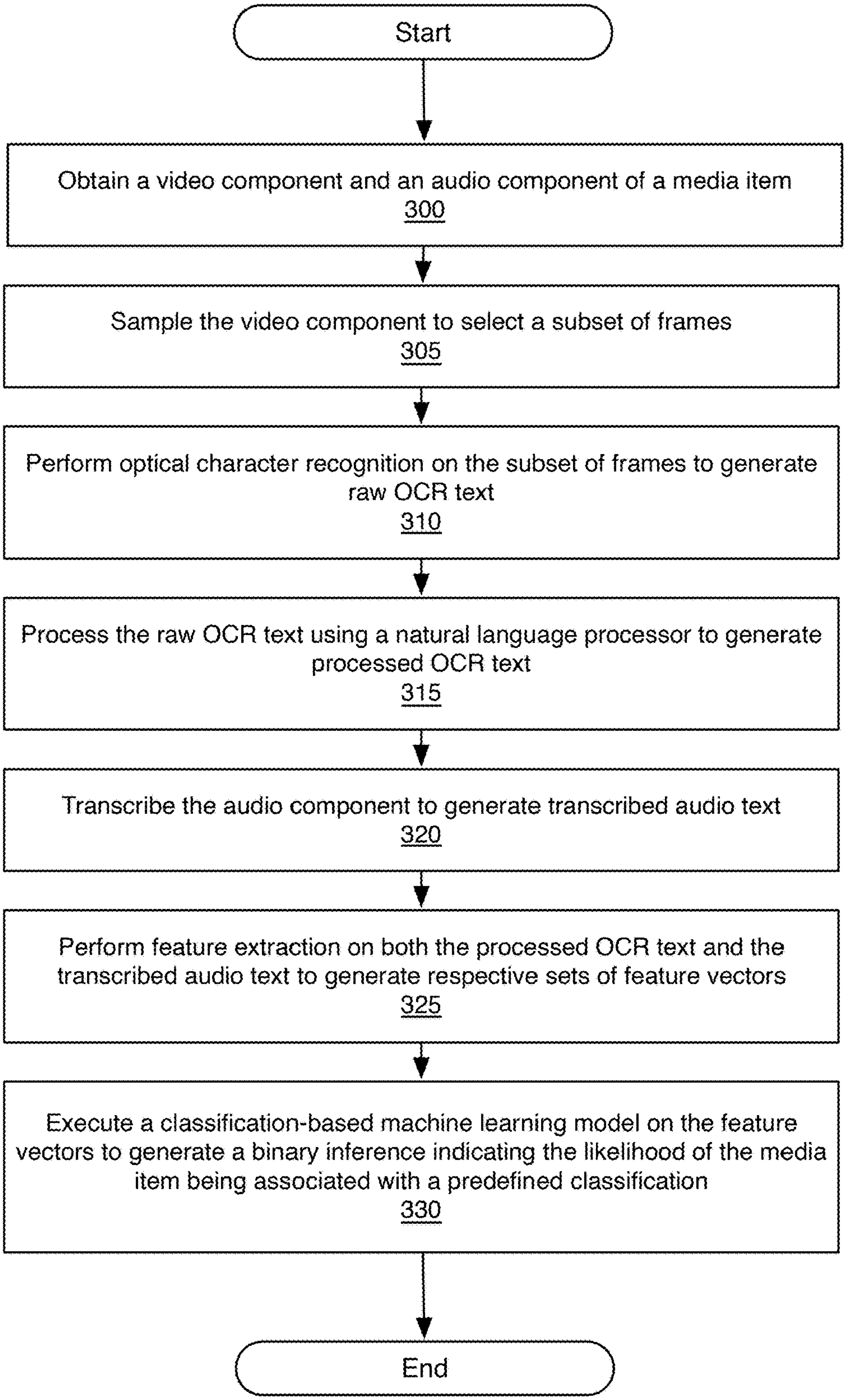
FIG. 3 shows a flowchart depicting execution of a classification system, in accordance with one or more embodiments.

FIG. 3 shows a flowchart of a process for classifying media content. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 300, the process begins with obtaining a video component and an audio component of a media item. Generally, this step involves accessing the media file that contains both visual and auditory data. Specifically, for example, the system may retrieve an MP4 file that comprises a video stream displaying an advertisement and an accompanying audio track with spoken content.

In STEP 305, the video component is accessed to select a subset of frames. This step may include extracting specific frames from the video to reduce the volume of data that needs to be processed while retaining key information. Specifically, the system might sample one frame per second from a 30-second video, resulting in 30 frames, ensuring that these frames are representative of the entire video content. Various forms of intelligent frame selection can be used, in accordance with various embodiments of the invention.

In STEP 310, optical character recognition (OCR) is performed on the subset of frames to generate raw OCR text. This step may involve analyzing the visual content of each sampled frame to detect and extract any text present. Specifically, each frame may be processed to identify text such as "Vote for Candidate X" or "Limited Time Offer," converting these visual text elements into raw text data.

In STEP 315, the raw OCR text is processed using a natural language processor to generate processed OCR text. This step may involve cleaning and structuring the extracted text to make it suitable for further analysis. Generating processed OCR text can include correcting OCR errors, normalizing text formats, and removing irrelevant characters, resulting in cleaned text.

In STEP 320, the audio component is transcribed to generate transcribed audio text. This step may involve converting the spoken content in the audio track into written text. For example, an audio transcription engine may be utilized to convert spoken phrases like "Support the new policy" or "Enjoy our special discount" into text, capturing the speech accurately for further processing.

In STEP 325, feature extraction is performed on both the processed OCR text and the transcribed audio text to generate respective sets of feature vectors. This may involve transforming the textual data into numerical representations that capture the semantic information of the text. In one example, a BERT model may be utilized to encode the processed OCR text and the transcribed audio text into feature vectors that represent its meaning and context.

In STEP 330, a classification-based machine learning model is executed on the feature vectors to generate a binary inference indicating the likelihood of the media item being associated with a predefined classification. This may involve using a trained machine learning model to analyze the feature vectors and classify the media item. In one example, a pretrained transformer model may be fine-tuned for the classification task, which processes the feature vectors and outputs a probability score, for example, indicating whether the media item is political or non-political. The system then uses the model output to determine the final classification decision.

Figure 4:
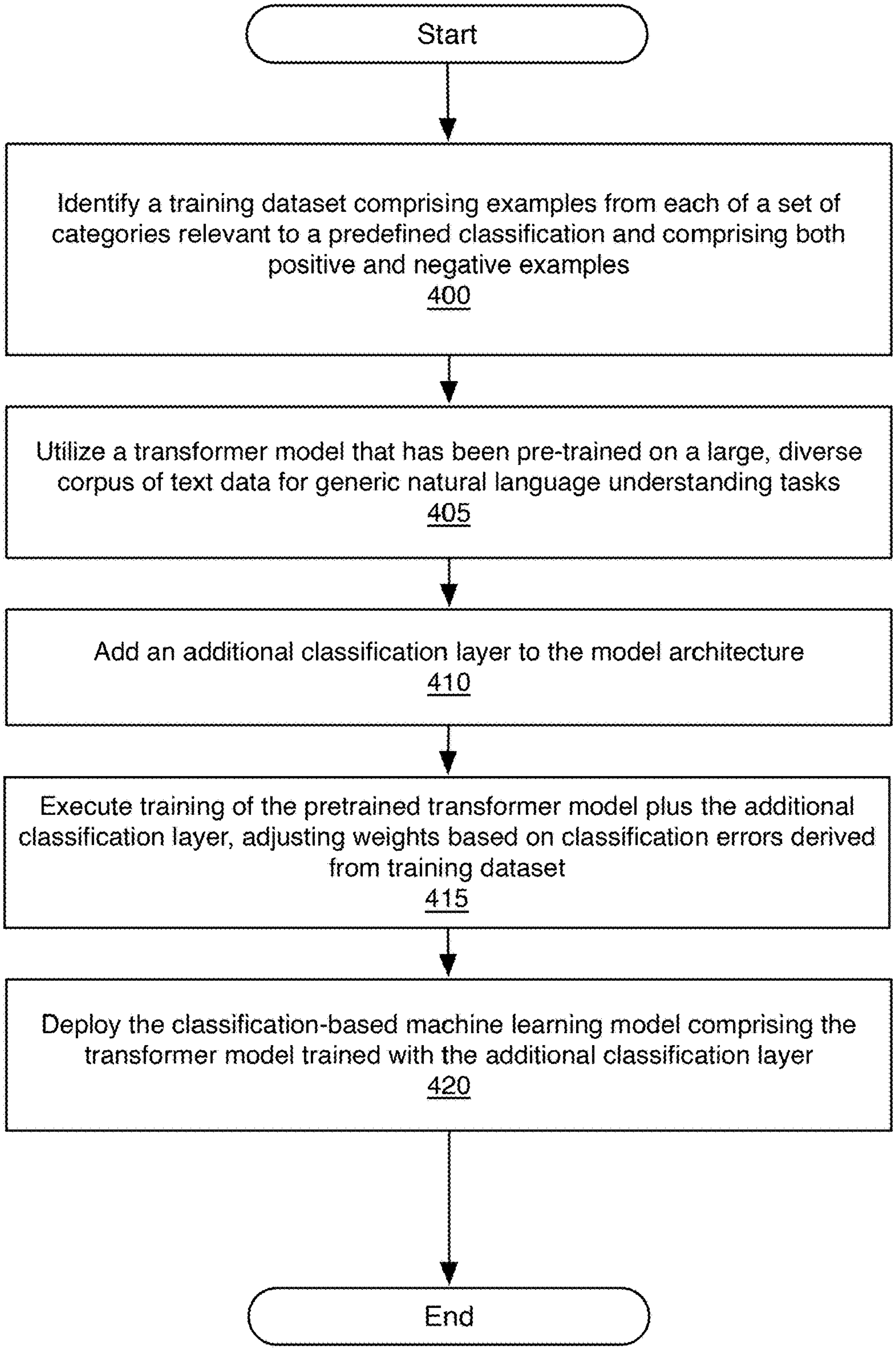
FIG. 4 shows a flowchart depicting training and deployment of a classification-based machine learning model, in accordance with one or more embodiments.

FIG. 4 shows a flowchart of a process for training and deploying a classification-based machine learning model. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP 400, the process begins by identifying a training dataset comprising examples from each of a set of categories relevant to a predefined classification. The training dataset includes examples from various relevant categories and comprises both positive and negative instances. This involves gathering a balanced dataset that will be used to train the additional classification layer. The dataset includes labeled examples of media content, such as a mix of political and non-political ads, to ensure comprehensive training exposure.

In STEP 405, a transformer model is utilized that has been pre-trained on a large, diverse corpus of text data for generic natural language understanding tasks.

In STEP 410, an additional classification layer is added to the model architecture. This new layer is initially untrained and is designed to make the final classification decision based on the features extracted by the transformer model. The classification layer may, for example, start with random weights and is set up to output a binary decision, such as whether a media item is political or non-political. The model is fine-tuned by adjusting the model's weights, improving its ability to identify and distinguish features pertinent to classifications such as political versus non-political content. This refinement uses a dataset of labeled examples to enhance the model's performance.

In STEP 415, the additional classification layer is trained by feeding the training dataset into the model and adjusting the weights based on classification errors. During training, the model's predictions are compared to the true labels, and the differences (errors) are used to update the weights (e.g., through backpropagation). This iterative process progressively improves the model's accuracy in making binary classification decisions.

In STEP 420, the fully trained classification-based machine learning model, which now includes the fine-tuned transformer and the trained classification layer, is deployed. This involves integrating the model into the operational environment where it will classify new media content. Once deployed, the model processes incoming media items, using the fine-tuned transformer and the additional classification layer to output accurate classification decisions.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 5:
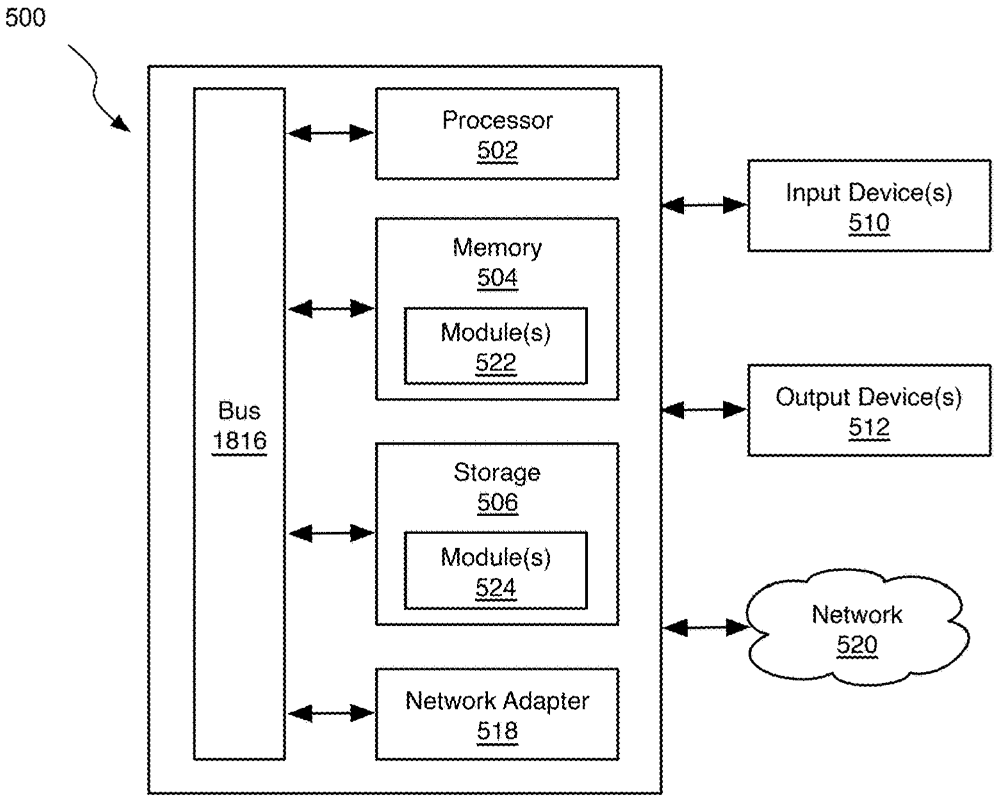
FIGS. 5 and 6 show a computing system and network architecture in accordance with one or more embodiments.

For example, as shown in FIG. 5, the computing system 500 may include one or more computer processor(s) 502, associated memory 504 (e.g., random access memory (RAM), cache memory, flash memory, etc.), one or more storage device(s) 506 (e.g., a hard disk, an optical drive such as a compact disk (CD) drive or digital versatile disk (DVD) drive, a flash memory stick, etc.), a bus 516, and numerous other elements and functionalities. The computer processor(s) 502 may be an integrated circuit for processing instructions. For example, the computer processor(s) may be one or more cores or micro-cores of a processor.

In one or more embodiments, the computer processor(s) 502 may be an integrated circuit for processing instructions. For example, the computer processor(s) 502 may be one or more cores or micro-cores of a processor. The computer processor(s) 502 can implement/execute software modules stored by computing system 500, such as module(s) 522 stored in memory 504 or module(s) 524 stored in storage 506. For example, one or more of the modules described herein can be stored in memory 504 or storage 506, where they can be accessed and processed by the computer processor 502. In one or more embodiments, the computer processor(s) 502 can be a special-purpose processor where software instructions are incorporated into the actual processor design.

The computing system 500 may also include one or more input device(s) 510, such as a touchscreen, keyboard, mouse, microphone, touchpad, electronic pen, or any other type of input device. Further, the computing system 500 may include one or more output device(s) 512, such as a screen (e.g., a liquid crystal display (LCD), a plasma display, touchscreen, or other display device), a printer, external storage, or any other output device. The computing system 500 may be connected to a network 520 (e.g., a local area network (LAN), a wide area network (WAN) such as the Internet, mobile network, or any other type of network) via a network interface connection 518. The input and output device(s) may be locally or remotely connected (e.g., via the network 520) to the computer processor(s) 502, memory 504, and storage device(s) 506.

One or more elements of the aforementioned computing system 500 may be located at a remote location and connected to the other elements over a network 520. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems and/or flowcharts. Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

Figure 6:
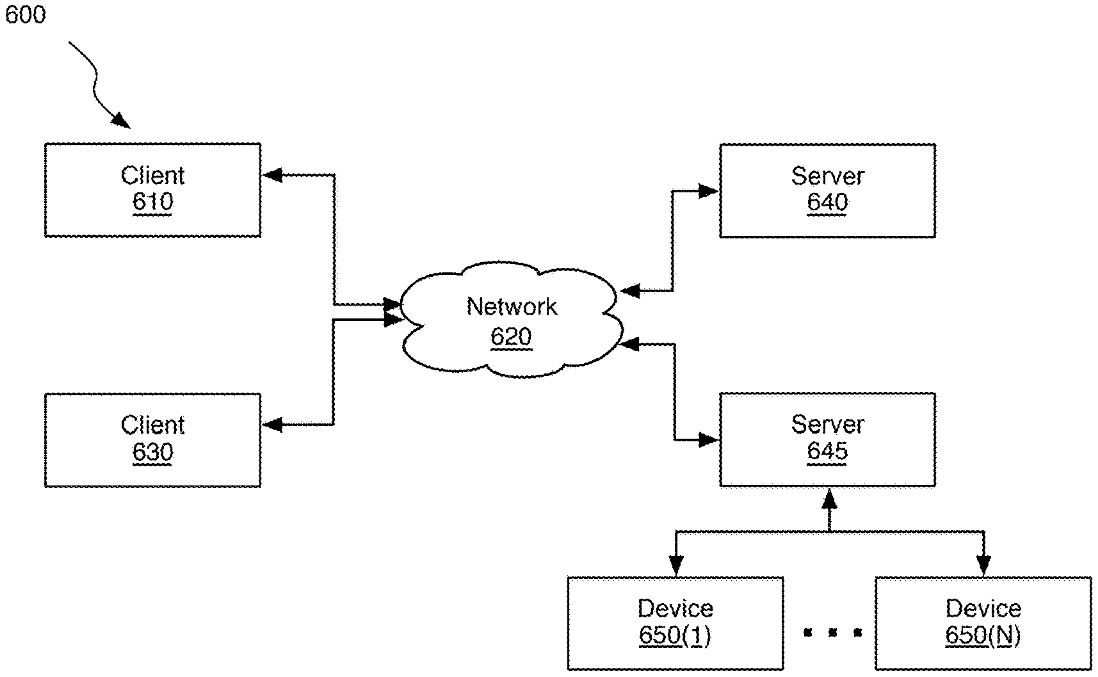

FIG. 6 is a block diagram of an example of a network architecture 600 in which client systems 610 and 630, and servers 640 and 645, may be coupled to a network 620. Network 620 may be the same as or similar to network 620. Client systems 610 and 630 generally represent any type or form of computing device or system, such as client devices (e.g., portable computers, smart phones, tablets, smart TVs, etc.).

Similarly, servers 640 and 645 generally represent computing devices or systems, such as application servers or database servers, configured to provide various database services and/or run certain software applications. Network 620 generally represents any telecommunication or computer network including, for example, an intranet, a wide area network (WAN), a local area network (LAN), a personal area network (PAN), or the Internet.

With reference to computing system 600 of FIG. 6, a communication interface, such as network adapter 618, may be used to provide connectivity between each client system 610 and 630, and network 620. Client systems 610 and 630 may be able to access information on server 640 or 645 using, for example, a Web browser, thin client application, or other client software. Such software may allow client systems 610 and 630 to access data hosted by server 640, server 645, or storage devices 650(1)-(N). Although FIG. 6 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 640, server 645, storage devices 650(1)-(N), or any combination thereof. All or a portion of one or more of the example embodiments disclosed herein may also be encoded as a computer program, stored in server 640, run by server 645, and distributed to client systems 610 and 630 over network 620.

Although components of one or more systems disclosed herein may be depicted as being directly communicatively coupled to one another, this is not necessarily the case. For example, one or more of the components may be communicatively coupled via a distributed computing system, a cloud computing system, or a networked computer system communicating via the Internet.

And although only one computer system may be depicted herein, it should be appreciated that this one computer system may represent many computer systems, arranged in a central or distributed fashion. For example, such computer systems may be organized as a central cloud and/or may be distributed geographically or logically to edges of a system such as a content/data delivery network or other arrangement. It is understood that virtually any number of intermediary networking devices, such as switches, routers, servers, etc., may be used to facilitate communication.

One or more elements of the aforementioned computing system 600 may be located at a remote location and connected to the other elements over a network 620. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

One or more elements of the above-described systems (e.g., FIGS. 1A-1D) may also be implemented using software modules that perform certain tasks. These software modules may include script, batch, routines, programs, objects, components, data structures, or other executable files that may be stored on a computer-readable storage medium or in a computing system. These software modules may configure a computing system to perform one or more of the example embodiments disclosed herein. The functionality of the software modules may be combined or distributed as desired in various embodiments. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1A-1D) and/or flowcharts (e.g., FIGS. 3-4). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A system for classifying media content, comprising:

a computer processor;

a video extraction and inference engine executing on the computer processor and comprising functionality to:

obtain a video component and an audio component of a media item;

analyze the video component to select a subset of frames;

perform optical character recognition (OCR) on the selected subset of frames to generate raw OCR text;

process the raw OCR text using a natural language processor to generate processed OCR text; and perform feature extraction on the processed OCR text to generate a first set of feature vectors representing the video component;

an audio extraction and inference engine comprising functionality to:

transcribe the audio component to generate transcribed audio text; and perform feature extraction on the transcribed audio text to generate a second set of feature vectors representing the audio component;

a classification model serving engine comprising functionality to:

execute a classification-based machine learning model based at least partially on the first set of feature vectors and the second set of feature vectors to generate a binary inference indicating the likelihood of the media item being associated with a predefined classification, wherein the classification-based machine learning model comprises a pretrained transformer model and an additional classification layer coupled to an output of the pretrained transformer model, the pretrained transformer model configured to utilize multiple layers of transformer units originally trained on a comprehensive corpus of text data for generating generalized language representations, and the additional classification layer configured to output the binary inference;

wherein the media item comprises an advertisement;

wherein the predefined classification designates that the media item is political in nature; and a media streaming service comprising functionality to:

identify a frequency management threshold associated with politics;

determine, based on the media item being designated as being political in nature, that the frequency management threshold is met for a designated recipient; and identify an alternate advertisement to serve to the designated recipient as a substitute for the media item.

2. The system of claim 1, further comprising:

a model training module comprising functionality to:

identify a training dataset comprising examples from each of a set of categories relevant to the predefined classification and comprising both positive and negative instances;

obtain the additional classification layer, initially untrained;

execute training of the pretrained transformer model and the additional classification layer, adjusting weights based on classification errors derived from the training dataset; and deploy the classification-based machine learning model comprising the pretrained transformer model trained with the additional classification layer.

3. The system of claim 1, wherein the audio extraction and inference engine further comprises functionality to:

obtain an additional audio stream of the media item comprising non-speech audio, wherein non-speech audio comprises at least one selected from a group consisting of background sounds and music;

generate an intermediate representation of the non-speech audio; and perform feature extraction on the intermediate representation to generate a third set of feature vectors representing the additional audio stream, wherein the classification-based machine learning model further utilizes the third set of feature vectors in generating the binary inference.

4. The system of claim 1, wherein the video extraction and inference engine further comprises functionality to:

extract a plurality of visual information from the video component of the media item; and perform feature extraction on the plurality of visual information to generate a third set of feature vectors representing the plurality of visual information, wherein the classification-based machine learning model further utilizes the third set of feature vectors in generating the binary inference.

5. The system of claim 1, wherein the classification-based machine learning model is configured as a binary classification model that outputs a classification vector for indicating whether the media item falls within political or non-political categories based on a highest value in the classification vector, and wherein the classification-based machine learning model is trained using a balanced dataset of political and non-political data.

6. The system of claim 1, wherein the classification-based machine learning model further utilizes Interactive Advertising Bureau (IAB) classification data as an input.

7. A method for classifying media content, comprising:

obtaining a video component and an audio component of a media item;

sampling the video component to select a subset of frames;

performing optical character recognition on the subset of frames to generate raw OCR text;

processing the raw OCR text using a natural language processor to generate processed OCR text;

transcribing the audio component to generate transcribed audio text;

performing feature extraction on both the processed OCR text and the transcribed audio text to generate respective sets of feature vectors;

executing, by a computer processor, a classification-based machine learning model on the feature vectors to generate a binary inference indicating the likelihood of the media item being associated with a predefined classification, wherein the classification-based machine learning model comprises a pretrained transformer model and an additional classification layer coupled to an output of the pretrained transformer model, the pretrained transformer model configured to utilize multiple layers of transformer units originally trained on a comprehensive corpus of text data for generating generalized language representations, and the additional classification layer configured to output the binary inference;

wherein the media item comprises an advertisement;

wherein the predefined classification designates that the media item is political in nature;

identifying a frequency management threshold associated with politics;

determining, based on the media item being designated as being political in nature, that the frequency management threshold is met for a designated recipient; and identifying an alternate advertisement to serve to the designated recipient as a substitute for the media item.

8. The method of claim 7, further comprising:

identifying a training dataset comprising examples from each of a set of categories relevant to the predefined classification and comprising both positive and negative instances;

obtaining the additional classification layer, initially untrained;

executing training of the pretrained transformer model and the additional classification layer, adjusting weights based on classification errors derived from the training dataset; and deploying the classification-based machine learning model comprising the pretrained transformer model trained with the additional classification layer.

9. The method of claim 7, further comprising:

obtaining an additional audio stream of the media item comprising non-speech audio, wherein non-speech audio comprises at least one selected from a group consisting of background sounds and music;

generating an intermediate representation of the non-speech audio; and performing feature extraction on the intermediate representation to generate a third set of feature vectors representing the additional audio stream, wherein the classification-based machine learning model further utilizes the third set of feature vectors in generating the binary inference.

10. The method of claim 7, further comprising:

extracting a plurality of visual information from the video component of the media item; and performing feature extraction on the plurality of visual information to generate a third set of feature vectors representing the plurality of visual information, wherein the classification-based machine learning model further utilizes the third set of feature vectors in generating the binary inference.

11. The method of claim 7, wherein the classification-based machine learning model is configured as a binary classification model that outputs a classification vector for indicating whether the media item falls within political or non-political categories based on a highest value in the classification vector, and wherein the classification-based machine learning model is trained using a balanced dataset of political and non-political data.

12. A non-transitory computer-readable storage medium comprising a plurality of instructions for classifying media content, the plurality of instructions configured to execute on at least one computer processor to enable the at least one computer processor to:

obtain a video component and an audio component of a media item;

analyze the video component to select a subset of frames;

perform optical character recognition on the subset of frames to generate raw OCR text;

process the raw OCR text using a natural language processor to generate processed OCR text;

transcribe the audio component to generate transcribed audio text;

perform feature extraction on both the processed OCR text and the transcribed audio text to generate respective sets of feature vectors;

execute a classification-based machine learning model on the feature vectors to generate a binary inference indicating the likelihood of the media item being associated with a predefined classification, wherein the classification-based machine learning model comprises a pretrained transformer model and an additional classification layer coupled to an output of the pretrained transformer model, the pretrained transformer model configured to utilize multiple layers of transformer units originally trained on a comprehensive corpus of text data for generating generalized language representations, and the additional classification layer configured to output the binary inference;

wherein the media item comprises an advertisement;

wherein the predefined classification designates that the media item is political in nature;

identify a frequency management threshold associated with politics;

determine, based on the media item being designated as being political in nature, that the frequency management threshold is met for a designated recipient; and identify an alternate advertisement to serve to the designated recipient as a substitute for the media item.

13. The non-transitory computer-readable storage medium of claim 12, wherein the plurality of instructions are further configured to enable the at least one computer processor to:

obtain an additional audio stream of the media item comprising non-speech audio, wherein non-speech audio comprises at least one selected from a group consisting of background sounds and music;

generate an intermediate representation of the non-speech audio; and perform feature extraction on the intermediate representation to generate a third set of feature vectors representing the additional audio stream, wherein the classification-based machine learning model further utilizes the third set of feature vectors in generating the binary inference.

14. The non-transitory computer-readable storage medium of claim 12, wherein the plurality of instructions are further configured to enable the at least one computer processor to:

extract a plurality of visual information from the video component of the media item; and perform feature extraction on the plurality of visual information to generate a third set of feature vectors representing the plurality of visual information, wherein the classification-based machine learning model further utilizes the third set of feature vectors in generating the binary inference.

15. The non-transitory computer-readable storage medium of claim 12, wherein the plurality of instructions are further configured to enable the at least one computer processor to:

identify a training dataset comprising examples from each of a set of categories relevant to the predefined classification and comprising both positive and negative instances, wherein the training dataset comprises balanced political and non-political data;

obtain the additional classification layer, initially untrained;

execute training of the pretrained transformer model and the additional classification layer, adjusting weights based on classification errors derived from the training dataset; and deploy the classification-based machine learning model comprising the pretrained transformer model trained with the additional classification layer.

* * * * *